US012586892B2

(12) United States Patent
Nair et al.

(10) Patent No.: US 12,586,892 B2
(45) Date of Patent: Mar. 24, 2026

(54) IMPLANT ANTENNA DEVICE AND SYSTEM

(71) Applicant: Velentium, LLC, Katy, TX (US)

(72) Inventors: Sujith Velayudhan Nair, Seabrook, TX (US); Christopher Jensen, Sugar Land, TX (US); Ryan Lockwood Clingan, Houston, TX (US); Phillip Clauda, Houston, TX (US); Timothy Adam Grogan, Houston, TX (US)

(73) Assignee: VELENTIUM, LLC, Katy, TX (US)

( * ) Notice: Subject to any disclaimer, the term of this patent is extended or adjusted under 35 U.S.C. 154(b) by 196 days.

(21) Appl. No.: 18/092,418

(22) Filed: Jan. 2, 2023

(65) Prior Publication Data

US 2023/0216198 A1 Jul. 6, 2023

Related U.S. Application Data

(60) Provisional application No. 63/295,986, filed on Jan. 3, 2022.

(51) Int. Cl.
*H01Q 9/26* (2006.01)
*H01Q 1/27* (2006.01)

(52) U.S. Cl.
CPC ............... *H01Q 1/273* (2013.01); *H01Q 9/26* (2013.01)

(58) Field of Classification Search
None
See application file for complete search history.

(56) References Cited

U.S. PATENT DOCUMENTS

| | | | | |
|---|---|---|---|---|
| 9,350,077 B1 * | 5/2016 | Zheng | ..................... | H01Q 5/357 |
| 9,955,289 B1 * | 4/2018 | Liu | ......................... | H01Q 1/273 |
| 2002/0138100 A1 * | 9/2002 | Stoll | ......................... | A61F 2/82 607/1 |

(Continued)

FOREIGN PATENT DOCUMENTS

EP 3200873 B1 6/2020

OTHER PUBLICATIONS

Madhumathi Raman, VSWR Calculator, calculated and captured on Sep. 13, 2024, Omni Calculator https://www.omnicalculator.com/physics/vswr-voltage-standing-wave-ratio (Year: 2024).*

(Continued)

*Primary Examiner* — Dameon E Levi
*Assistant Examiner* — Anh N Ho
(74) *Attorney, Agent, or Firm* — Chamberlain, Hrdlicka, White, Williams & Aughtry P.C.; Aly Z. Dossa

(57) ABSTRACT

An implantable radiating structure includes a directly excited element ("DEE") that includes a top portion, a gap portion, and a bottom portion. The gap portion is between the top portion and the bottom portion. The top portion is coupled to the bottom portion via a connector, and the top portion, the gap portion, and the bottom portion of the DEE are planar. The implantable radiating structure also includes an indirectly excited element ("IEE") radiatively coupled to the DEE. The IEE is positioned at an angle with respect to the DEE, and the DEE is orthogonal to the IEE. Further, the implantable radiating structure is configured to be implanted inside a human body and includes a bandwidth of at least 150 megahertz and a voltage standing wave ratio of approximately 2.

16 Claims, 27 Drawing Sheets

(56) References Cited

U.S. PATENT DOCUMENTS

| | | | | |
|---|---|---|---|---|
| 2009/0248112 A1* | 10/2009 | Mumbru | A61N 1/37512 | 607/60 |
| 2012/0001812 A1* | 1/2012 | Zhao | H01Q 1/36 | 343/900 |
| 2015/0255858 A1* | 9/2015 | Li | A61N 5/04 | 343/702 |
| 2018/0269564 A1* | 9/2018 | Venkatasubramanian | H01Q 21/00 | |
| 2019/0168005 A1* | 6/2019 | Li | A61B 7/00 | |
| 2019/0299014 A1* | 10/2019 | Lim | A61N 1/37229 | |
| 2021/0266019 A1* | 8/2021 | Perri | H01Q 1/273 | |

OTHER PUBLICATIONS

VSWR (Voltage Standing Wave Ratio), captured by Wayback Machine on Dec. 5, 2021, Antenna-Theory website https://www.antenna-theory.com/definitions/vswr.php (Year: 2021).*

Aldaoud et al., Wide dipole antennas for wireless powering of miniaturised bioelectronic devices, Sensing and Bio-Sensing Research, 2020, 8 pages.

Alrawashdeh et al., A Flexible Loop Antenna for Total Knee Replacement Implants in the MedRadio Band, IEEE Loughborough Antennas & Propagation Conference, Nov. 11-12, 2013, pp. 225-228.

Bakogianni et al., Design of a Novel Compact Printed Folded Dipole Antenna for Biomedical Applications, The 8th European Conference on Antennas and Propagation (EuCAP 2014), Year 2014, pp. 3178-3182.

Bakogianni et al., Fundamental Design Analysis of Small Implantable Dipole Antennas, IEEE, 2015, pp. 770-771.

Bakogianni et al., Performance of a Novel Miniature Antenna Implanted into the Human Trunk for Medical Telemetry Applications.

Basari et al, Implanted helical dipole antenna for UHF ban applications, Proceedings of ISAP2012, Nagoya, Japan, 2012, pp. 1256-1259.

Basari et al., A Helical Folded Dipole Antenna for Medical Implant Communication Applications, IEEE MTT-S International Microwave Workshop Series on RF and Wireless Technologies for Biomedical and Healthcare Applications (IMWS-BIO), 2013.

Basari et al., A Simple Folded Dipole Antenna for Medical Implant Communications at 900 MHz Band, Proceedings of APMC 2012 Kaohsiung Taiwan, Dec. 4-7, 2012, pp. 421-423.

Bhattacharjee et al., Performance enhancement of implantable medical antenna using differential feed technique, Engineering Science and Technology, an International Journal, Year 2015, pp. 642-650.

Bong et al., Compact Folded Dipole With Embedded Matching Loop for Universal Tag Applications, IEEE Transactions on Antennas and Propagation, May 2017, pp. 2173-2181, vol. 65, No. 5.

Das et al., Fully Printed and Electrically Small Folded Dipole with Inherent Matching, 2020 IEEE International Symposium on Antennas and Propagation and North American Radio Science Meeting, (Year 2020), p. 389-390.

Das et. al, Design of a Highly Miniaturized, Inherently Matched, Spherical Folded Dipole Antenna and Evaluation of Its Quality Factor, IEEE Transactions on Antennas and Propagation, Dec. 2021, pp. 8914-8919, vol. 69, No. 12.

Dr. Ali Harmouch et al., Miniaturization of the Folded Dipole Antenna, IEEE, pp. 29-33.

Dung et al., Investigating Equations Used to Design a Very Small Normal-Mode Helical Antenna in Free Space, Hindawi International Journal of Antennas and Propagation, 2018, 7 pages a href="https://doi.org/10.1155/2018/7967468" target="_blank"https://doi.org/10.1155/2018/7967468/a, vol. 2018, Article ID 7967468.

Elsheakh et al., Single-Chip Two Antennas for MM-Wave Self-Powering and Implantable Biomedical Devices, Research Square, pp. 1-14 Posted Date: Apr. 15, 2021 https?//doi.org/10.21203/rs.3.rs-332417/v1.

Fang et al., MICS-Band Helical Dipole Antenna for Biomedical Implants, IEEE Antennas and Wireless Propagation Letters, Dec. 2022, pp. 2502-2506, vol. 21, No. 12.

Fang-Mei et al., Meander Dipole Antenna design for Passive UHF RFID Tags, 2nd International Conference on Electrical Computer Engineering and Electronic, 2015, pp. 767-772.

Gozasht et al., Miniaturized Slot PIFA Antenna for Tripleband Implantable Biomedical Applications, IEEE MTTS International Microwave Workshop Series on RF and Wireless Technologies for Biomedical and Healthcare Applications (IMWS-BIO), 2013.

Huang et al., Electrically Small Folded Ellipsoidal Helix Antenna for Medical Implant Applications, IEEE, 2011, pp. 769-771.

Kanaya et al., 2.4GHz Monopole Antenna on Flexible Substrate for Implanting Sensor, IEEE, 2017, pp. 391-392.

Lin et al., Performance of Implantable Folded Dipole Antenna for In-Body Wireless Communication, IEEE Transactions on Antennas and Propagation, Mar. 2013, Vo. 61, No. 3.

Mazumder et al., A Wideband Folded Dipole RFID Tag with Improved Impedance Matching Technique, IEEE.

Mizuno et al., Design of a Helical Folded Dipole Antenna for Biomedical Implants, EuCAP 2011—Convened Papers, Year 2011, pp. 3484-3487.

Morimoto et al., Design of Ultra Wide-Band Low-Band Implant Antennas for Capsule Endoscope Application, 7th International Symposium on Medical Information and Communication Technology (ISMICT), Year 2013, pp. 61-65.

Moussa et al., Meander line antenna for RFID applications in health care, ResearchGate, 2011, a href="https://www.researchgate.net/publication/221278931" target="_blank"https://www.researchgate.net/publication/221278931/a.

Nakano et al., Shortening Ratios of Modified Dipole Antennas, IEEE Transactions on Antennas and Propagation, Apr. 1984, pp. 385-386, vol. AP-32, No. 4.

Rashed et al., A New Class of Resonant Antennas, IEEE Transactions on Antennas and Propagation, Sep. 1991, vol. 39, No. 9.

Scarpello et al., Design of an Implantable Slot Dipole Conformal Flexible Antenna for Biomedical Applications, IEEE Transactions on Antennas and Propagation, Oct. 2011, pp. 3556-3564, vol. 59, No. 10.

Skrivervik et al., Implantable antennas: The Challenge of Efficiency, 7th European Conference on Antennas and Propagation (EUCAP 2013)—Convened Sessions, Year 2013, pp. 3516-3520.

Trivedi et al., A Novel approach for Stacked Patch antenna for large bandwidth applications, IOSR Journal of Electrical and Electronics Engineering (IOSR-JEEE), Mar.-Apr. 2014, vol. 9, Issue 2 Ver. II www.iosrjournals.org, 6 pages.

* cited by examiner

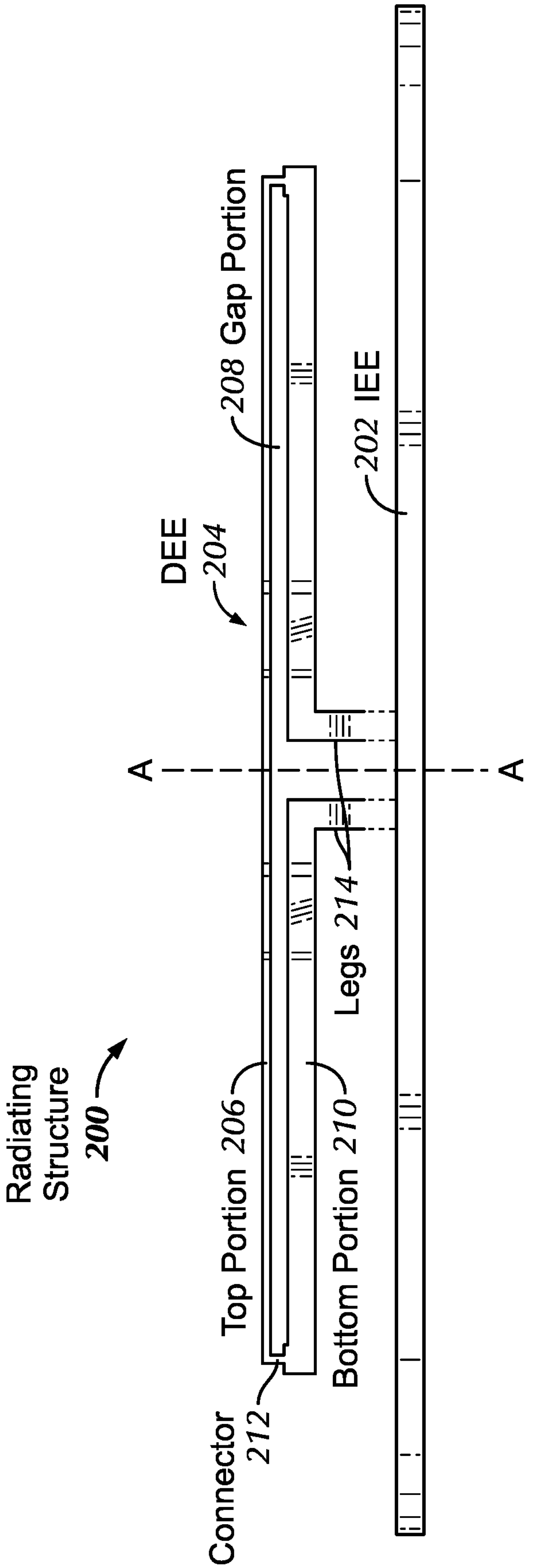
FIG. 2.1

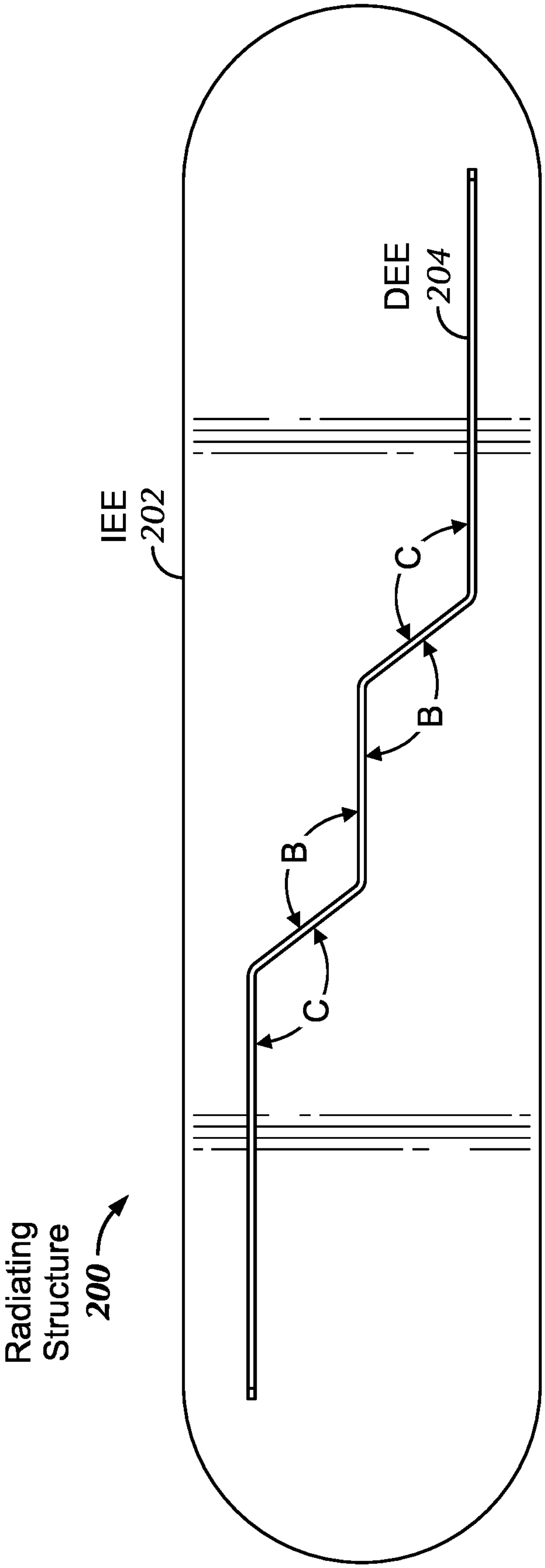
*FIG. 2.2*

IMPLANT ANTENNA DEVICE AND SYSTEM

BACKGROUND

As the value of obtaining data from within the human body increases, individuals and businesses seek additional ways to acquire information relating to conditions inside of the human body. One option available is implantable medical devices. Implantable medical devices may be implanted inside a human body to acquire data from within the human body and transmit that data to objects outside of the human body. Antennas electrically coupled to implantable medical devices may be used to send and receive information from the implantable medical devices. However, conditions within the human body provide an adverse environment for antennas. For example, the dielectric properties of the human body are constantly changing and the position and/or orientation of the antenna may change after implantation due to the constantly changing environment within the human body.

SUMMARY

In one aspect, an implantable radiating structure includes a directly excited element ("DEE") that includes a top portion, a gap portion, and a bottom portion. The gap portion is between the top portion and the bottom portion. The top portion is coupled to the bottom portion via a connector, and the top portion, the gap portion, and the bottom portion of the DEE are planar. The implantable radiating structure also includes an indirectly excited element ("IEE") radiatively coupled to the DEE. The IEE is positioned at an angle with respect to the DEE, and the DEE is orthogonal to the IEE. Further, the implantable radiating structure is configured to be implanted inside a human body and includes a bandwidth of at least 150 megahertz and a voltage standing wave ratio of approximately 2.

In one aspect, an implantable radiating structure includes a DEE that includes a top portion, a gap portion, and a bottom portion. The gap portion is between the top portion and the bottom portion. The top portion is coupled to the bottom portion via a connector. The implantable radiating structure also includes an IEE radiatively coupled to the DEE. The IEE is positioned at an angle with respect to the DEE, and the implantable radiating structure is configured to be implanted inside a human body.

In one aspect, a method for manufacturing a radiating structure includes forming, from a first sheet of metal, a DEE that includes a top portion, a gap portion, and a bottom portion. The gap portion is between the top portion and the bottom portion, and the top portion is coupled to the bottom portion via a connector. The method further includes forming, from a second sheet of metal, an IEE. Moreover, the method includes affixing the DEE to the IEE at an angle, and affixing the DEE to the IEE radiatively couples the IEE to the DEE.

Other aspects of the invention will be apparent from the following description and the appended claims.

BRIEF DESCRIPTION OF DRAWINGS

FIG. 2.1 shows a front view of a radiating structure in accordance with one or more embodiments of the invention;

FIG. 2.2 shows a top view of a radiating structure in accordance with one or more embodiments of the invention;

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for radiating structures for implantable medical devices and the formation of such structures. For example, it may be useful to send and/or receive information from implantable medical devices. Further, providing a physical connection to an implantable medical device may not be feasible due to the location of the implantable medical device. Thus, providing wireless communication between the implantable medical device and some other device outside of the human body may be useful.

To provide this wireless communication, the implantable medical device may include a radiating structure. The radiating structure may be able to send and receive signals from outside the human body. However, the human body provides an adverse environment for radiating structures. For example, the dielectric properties of the human body are constantly changing and the position and/or orientation of the radiating structure may change after implantation due to the constantly changing environment within the human body.

Embodiments of the invention may provide methods and systems that provide wireless communications between an implantable medical device and a device outside the human body. By doing so, the systems may provide more reliable communication between implantable medical devices and devices external to the human body. Further, the methods provided by the embodiments of the invention may provide a radiating structure at a lower cost.

Figure 1:
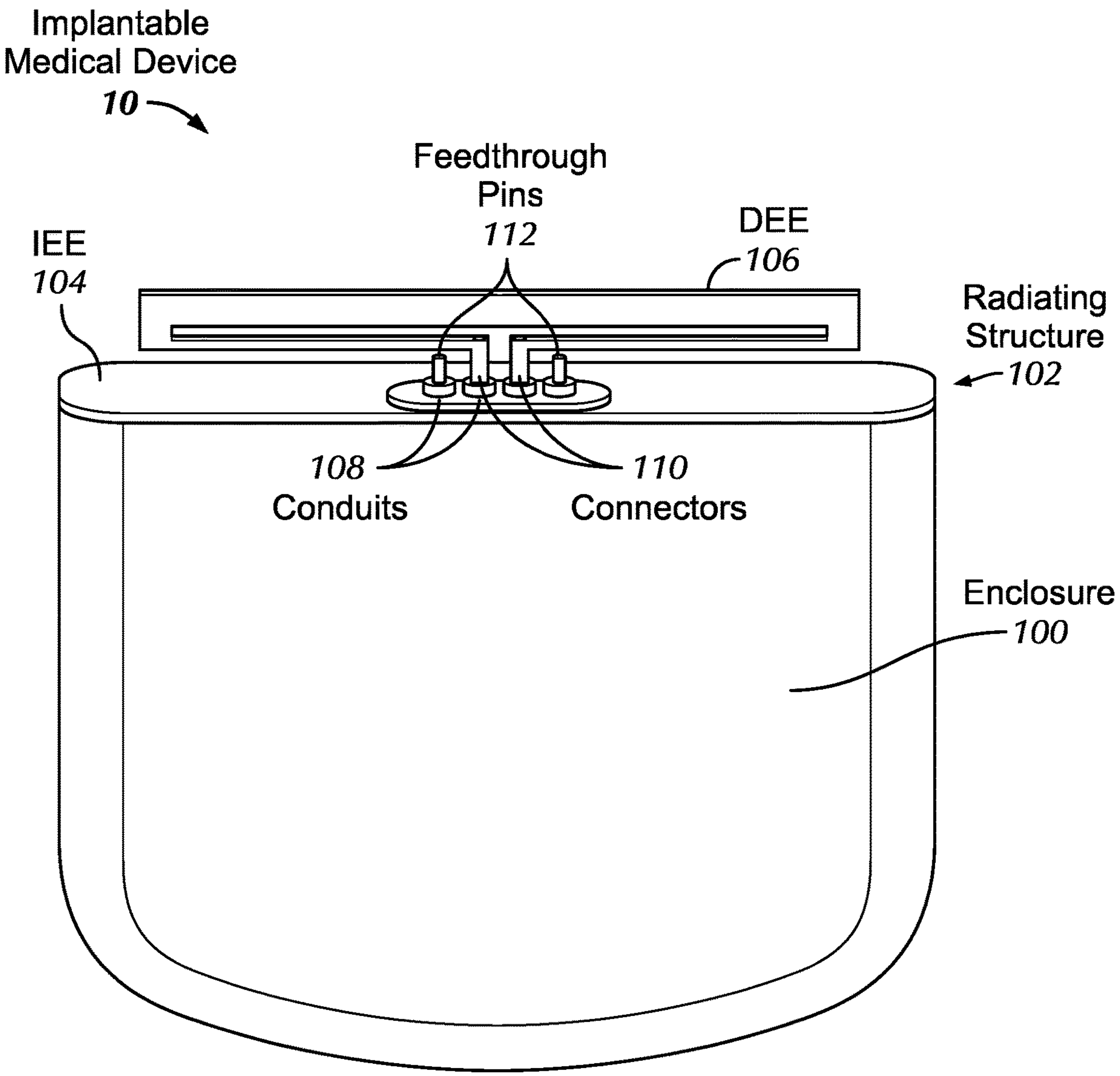
FIG. 1 shows an isometric view of an implantable medical device in accordance with one or more embodiments of the invention.

FIG. 1 shows an isometric view of an implantable medical device (10) that includes an enclosure (100) to house the electronics and a radiating structure (102). The implantable medical device (10) may be implanted inside a human body as part of a medical procedure. For example, the implantable medical device (10) may be used to gather medical data of the person in which the implantable medical device (10) is implanted.

The enclosure (100) contains circuitry in a sealed case. The circuitry within the enclosure (100) may include one or more sensors to gather data. Further, the enclosure (100) may include a transmitter, a receiver, a transceiver, or any combination thereof to enable the implantable medical device (10) to wirelessly send and receive information to and from objects outside of the human body in which the implantable medical device (10) resides.

To this end, the radiating structure (102) is electrically coupled to electronic circuitry contained within the enclosure (100) and is configured to send and receive wireless electric signals. For example, the implantable medical device (10) may gather some information about conditions present in the human body, and transmit the data indicative of the conditions. The transmission may then be received by a device proximate to the implantable medical device (10) and outside of the human body. Likewise, data may be transmitted by a device proximate to the human body that is then received by the implantable medical device (10) via the radiating structure (102). As such, the radiating structure (102) enable the implantable medical device (10) to wirelessly communicate with devices outside of the human body in which it is implanted.

The radiating structure (102) includes an indirectly excited element ("IEE") (104) and a directly excited element ("DEE") (106). The IEE (104) includes one or more sealable conduits (108) through which connectors (110) and feedthrough pins (112) may pass. For example, the connectors (110) may electrically couple the DEE (106) to electrical circuitry contained within the enclosure (100) (e.g., a transmitter, a receiver, a transceiver, or any combination thereof). Further, the feedthrough pins (112) may extend out of the enclosure (100) and through the IEE (104). The feedthrough pins may be utilized to gather data within the human body.

The DEE (106) is a conductive element portion of the radiating structure (102) utilized to send and receive electrical signals at a desired frequency. The DEE (106) may be located wholly outside of the enclosure (100) and be coupled to circuitry within the enclosure (100) via the connectors (110). The circuitry within the enclosure (100) provides the electrical excitation to the DEE (106), which converts the electrical signals to electromagnetic radiation. In addition, the IEE (104) affects the electromagnetic radiation from the DEE (106) and together the IEE (104) and DEE (106) form the radiating structure (102) with desired radiation properties. As described in detail below, the DEE (106) and IEE (104) may be sized and shaped to provide different properties such as impedance, resonant frequency, and bandwidth. It should be understood that the radiating structure (102) with the IEE (104) and the DEE (106) may be considered an antenna because the IEE (104) and the DEE (106) work together to provide a signal that is receivable by another device. Thus, any mention of the radiating structure (102) may also be considered an antenna.

FIG. 2.1 shows a front view of an embodiment of a radiating structure (200) that includes an IEE (202) and a DEE (204). The DEE (204) and/or IEE (202) may be symmetric about an axis A, which extends through a center of the IEE (202) and the DEE (204). This symmetry enables the DEE (204) geometry with respect to the IEE to be symmetric, and thus the radiation pattern, to be the same, regardless of the orientation in which implantable medical device is implanted. As such, the radiation pattern provided by the radiating structure (200) is predictable and reliable. Further, the symmetry about the axis A provides a wide azimuthal radiation coverage (shown below). For example, the azimuthal coverage maybe be +/−60 degrees, 70 degrees, 80 degrees, 90 degrees, 100 degrees, 110 degrees, 120 degrees, or any other angle between 60 and 120 degrees with respect to the axis A.

The DEE (204) includes a top portion (206), a gap portion (208), a bottom portion (210), connector (212), and legs (214). The top portion (206) is connected to the bottom portion (210) via one or more connectors (212). The connectors (212) may be positioned at the end of one or the top portion (206) (as shown), the bottom portion (210), or both. For example, the connectors (212) are shown as being orthogonal to the top portion (206) and the bottom portion (210); however, the connectors (212) may be connected at any angle between the top portion (206) and the bottom portion (210). Further, while two connectors (212) are illustrated, it should be appreciated that any number of connectors (212) may be implemented, including 1, 2, 3, 4, 5, 6, or more.

The legs (214) extend from the bottom portion (210) toward the IEE (202). The legs (214) are configured to electrically couple to circuitry (not shown) to complete a circuit. To this end, the legs (214) may have the same width as the bottom portion (210). Further, the legs (214) may be omitted and the circuitry within the enclosure (not shown) may be connected directly to the bottom portion (210) through the IEE (202).

As illustrated, the length of the top portion (206) is about 22 millimeters, the length of the bottom portion (210) is about 22.5 millimeters, the width of the top portion is about 0.15 millimeters, the width of the bottom portion is about 0.5 millimeters, the width of the gap portion (208) is about 0.3 millimeters, the distance between the bottom of the bottom portion (210) and the top of the IEE (202) is about 5 millimeters, and the distance between the legs (214) is about 1 millimeter.

Further, the dimensions of the top portion (206), the gap portion (208), and the bottom portion (210) may be adjusted to adjust the properties of the radiating structure (200) (e.g., the impedance, resonant frequency, and/or bandwidth). For example, the length of the top portion (206) may be different or the same as the bottom portion (210), the width of the top portion (206) may be different or the same as the bottom portion (210), or the cross-sectional area of the top portion (206) may be different or the same as the bottom portion (210). In one or more embodiments, the width of the top portion (206) and/or the bottom portion (210) may be 0.1, 0.2, 0.3, 0.5, 1, 2, 3, 4, or 5 millimeters, or any distance between 0.1 and 5 millimeters. In one or more embodiments, the length of the top portion (206) and/or the bottom portion (210) may be 10, 15, 20, 25, 30, or 35 millimeter, or any distance between 10 and 35 millimeters. In one or more embodiments, the distance between the bottom of the bottom portion (210) and the top of the IEE (202) may be 0.5, 1, 2, 3, 4, 5, 6, 7, 8, 9, or 10 millimeters, or any distance between 0.5 and 10 millimeters. Further, in one or more embodiments, the width of the gap portion (208) may be 0.1, 0.2, 0.3, 0.5, 1, 2, 3, 4, or 5 millimeters, or any distance between 0.1 and 5 millimeters. In one or more embodiments, the distance between the two legs (214) may be 0.1, 0.2, 0.3, 0.5, 1, 2, 3, 4, or 5 millimeters, or any distance between 0.1 and 5 millimeters. Adjusting the above dimensions can adjust the impedance, resonant frequency, or bandwidth of the radiating structure (200).

In addition, the radiating structure (200) is designed to have a wide bandwidth. Being implanted in a human body means that the material surrounding the DEE (204) and IEE (202) will be unique and changing. The fat content, hydration level, diet, exact implant location, and many other factors will change the dielectric properties of the material surrounding the DEE (204) and IEE (202). Thus, the resonant frequency of the radiating structure (200) will be constantly changing even when remaining stationary in a human body. The increase in bandwidth is accomplished by decreasing the reactance of the radiating structure (200) by simultaneously reducing the inductance and increasing the capacitance. Further, the width of the gap portion (208) may be chosen to be much smaller than the wavelength of the resonant frequency such that the surfaces of the top portion (206), the gap portion (208), and the bottom portion (210) act as a contiguous planar surface with respect to an electromagnetic wave at the resonant frequency. For example, the bandwidth may be 100, 200, 300, 400, 500, 600, 700, 800, 900, or 1000 megahertz wide, or any width between 100 and 1000 megahertz. Further, the voltage standing wave ratio may be 1, 1.2, 1.4, 1.6, 1.8, 2.0, or 2.5, or any number between 1 and 2.5.

Further, the dimensions of the DEE (204) and its separation from the IEE (202) may be adjusted such that the impedance of the DEE (204) matches the impedance of the circuitry internal to the enclosure allowing for maximum energy transfer between the radiating structure (200) and the transceiver. By doing so, the circuitry inside of the enclosure may not include any impedance matching components. Thus, insertion loss caused by impedance matching components is eliminated and the size of the circuitry within the enclosure may be reduced due to the exclusion of impedance matching components.

FIG. 2.2 show a top view of an embodiment of the radiating structure (200). In one or more embodiments the DEE (204) includes one or more bends along its length. In the present embodiment, the DEE (204) includes four bends along its length such that the DEE (204) maintains the symmetry described above. For example, the DEE (204) has a first set of matching bends at a first angle B and a second set of matching bends at a second angle C. In some embodiments, angles B and C may be the same. However, it should be appreciated that, in some embodiments, angles B and C may be different. For example, angle B and/or C may be 90, 100, 110, 120, 130, 140, or 150 degrees, or any angle between 90 and 150 degrees.

Figure 3:
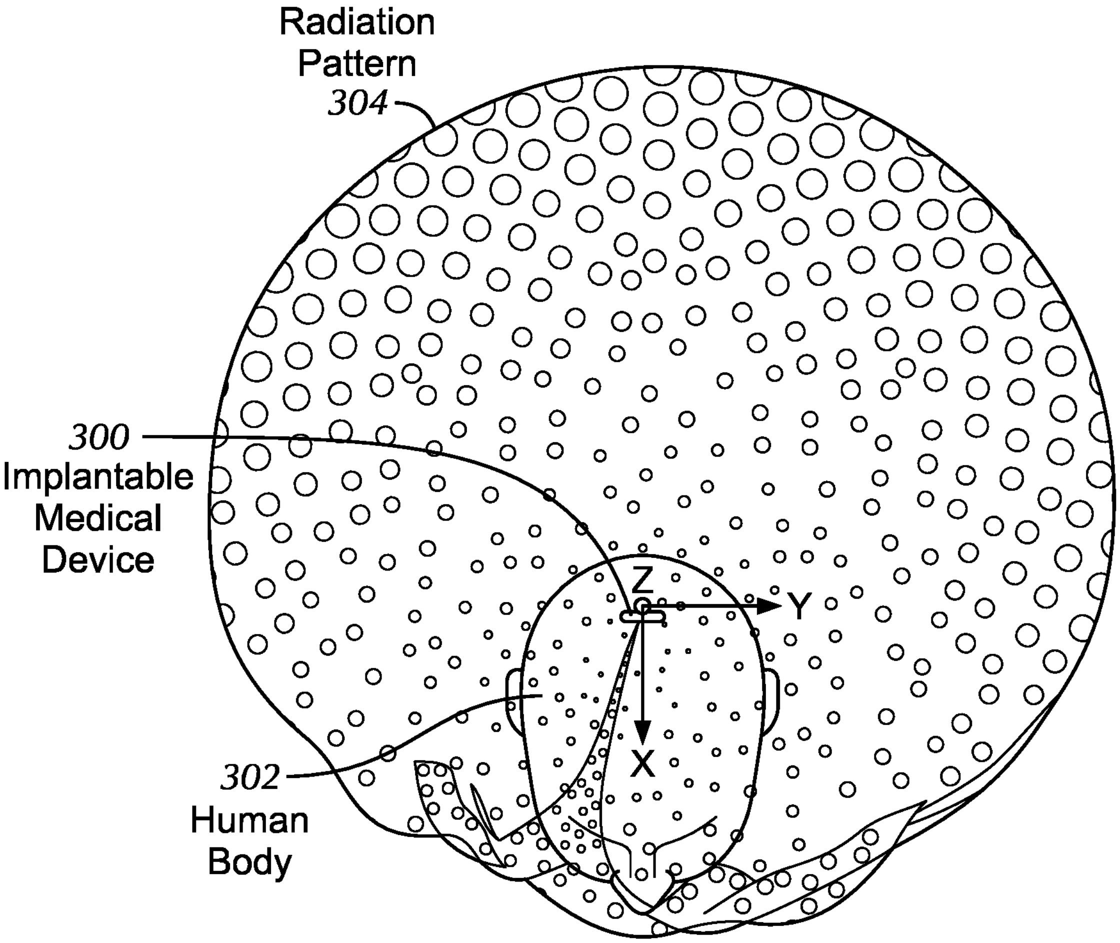
FIG. 3 shows a view of a radiation pattern of an implantable medical device in accordance with one or more embodiments of the invention.

FIG. 3 shows a top view of an implantable medical device (300) inside a human body (302), and the radiation pattern (304) of the implantable medical device (300). As can be seen, the radiation pattern (304) is symmetric from left to right. This symmetry of the radiation pattern (304) is caused, at least in part, by the symmetry of the radiating structure (not shown) of the implantable medical device (300). Further, as described above, the implantable medical device (300) may be implanted in any orientation and still achieve the symmetric radiation pattern (304) due, at least in part, to the symmetry of the radiating structure (not shown) of the implantable medical device (300).

Figure 4:
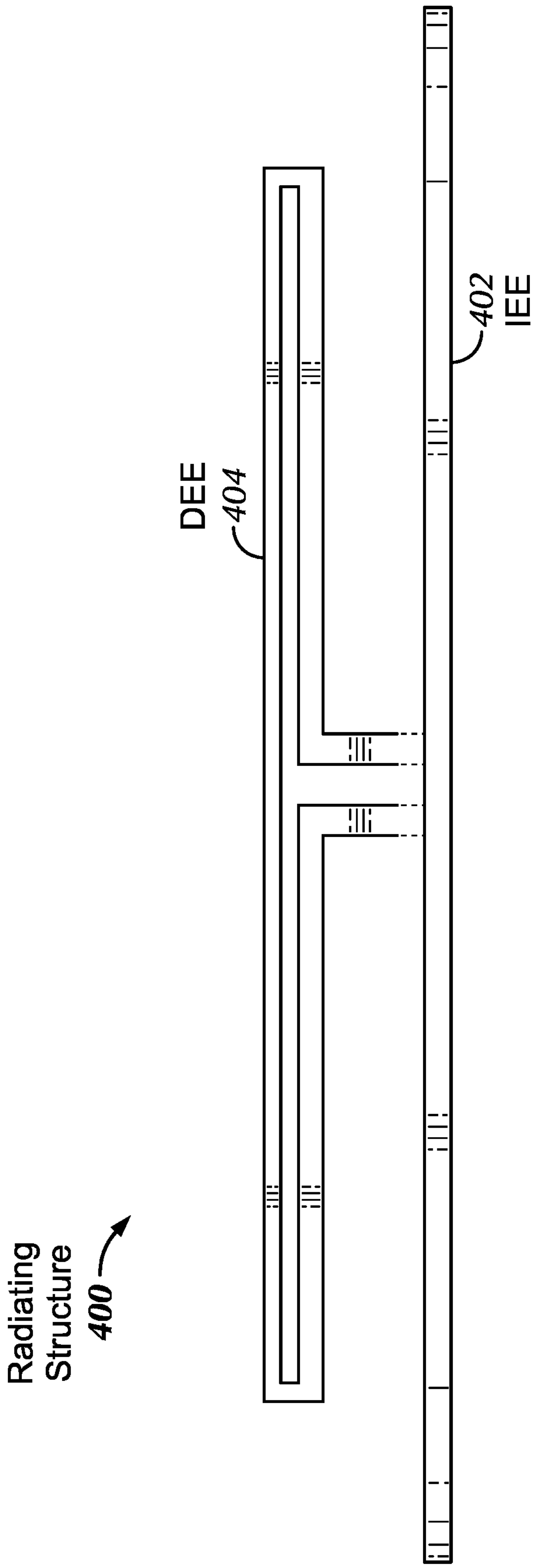
FIG. 4 shows a front view of a radiating structure in accordance with one or more embodiments of the invention.

FIG. 4 shows a front view of an embodiment of a radiating structure (400) that includes an IEE (402) and a DEE (404). In the present embodiment, the DEE is a planar structure (meaning that all portions of the DEE (404) lie along the same plane). Further, in the present embodiment, the DEE (404) is orthogonal to the IEE (402).

As illustrated, the length of the top portion is the same as the length of the bottom portion, which is about 23 millimeters, the width of the top portion is about 0.3 millimeters, the width of the bottom portion is about 0.45 millimeters, the width of the gap portion is about 0.3 millimeters, the distance between the bottom of the bottom portion and the top of the IEE (402) is about 3 millimeters, and the distance between the legs is about 0.7 millimeters.

Figure 5:
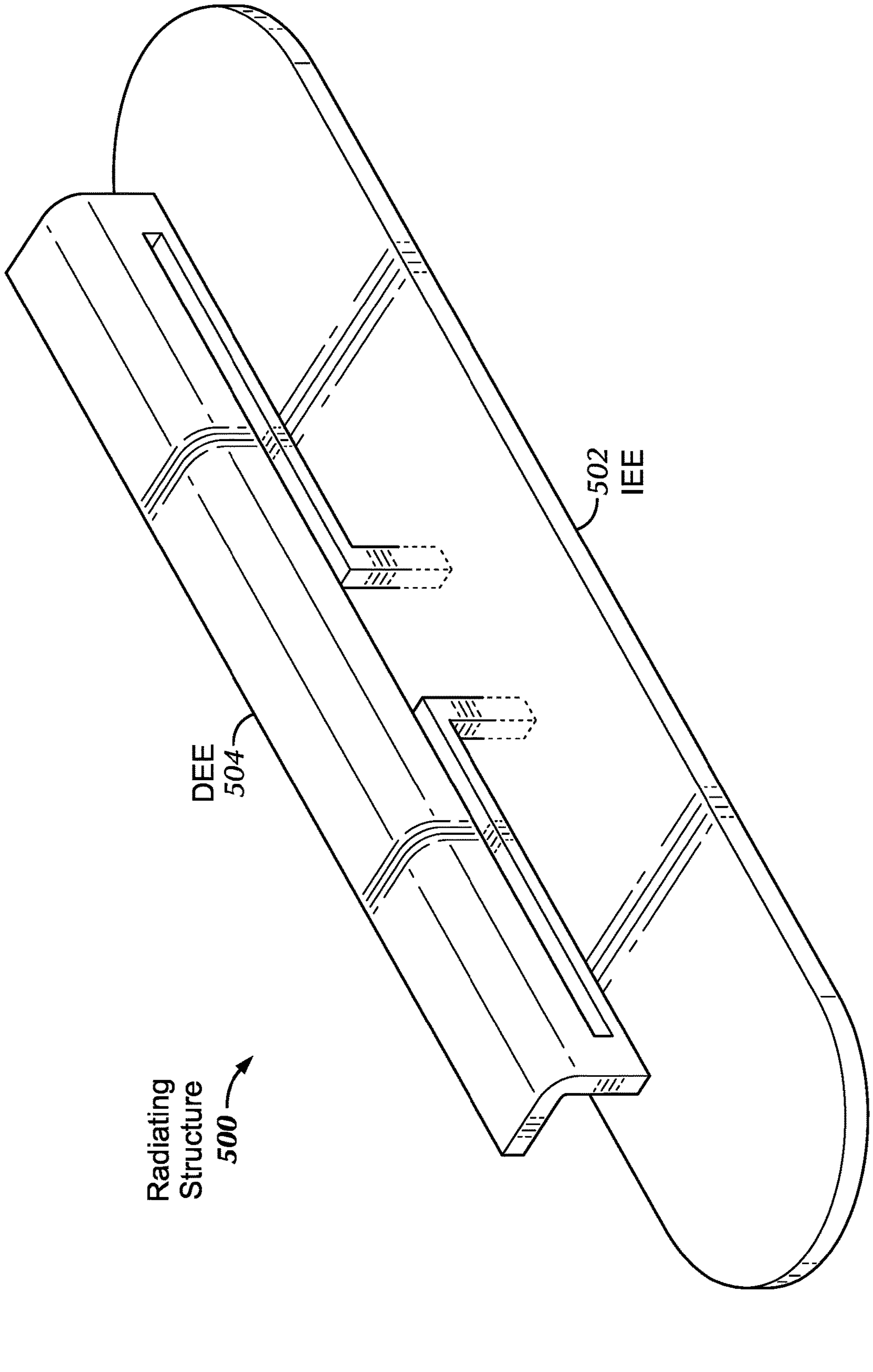
FIG. 5 shows an isometric view of a radiating structure in accordance with one or more embodiments of the invention.

FIG. 5 shows an isometric view of an embodiment of a radiating structure (500) that includes an IEE (502) and a DEE (504). In the present embodiment, the top portion of the DEE (504) includes a bend of about 90 degrees with a radius of curvature of about 0.1 millimeters. In some embodiments, the bend may be 30, 60, 90, 120, 150, or 180 degrees or any angle between 30 and 180 degrees. Further, the radius of curvature may be 0.1, 0.2, 0.3, 0.5, 1, or 2 millimeters or any distance between 0.1 and 2 millimeters.

As illustrated, the length of the top portion is the same as the length of the bottom portion, which is about 22 millimeters, the width of the top portion is about 1.5 millimeters, the width of the bottom portion is about 0.3 millimeters, the width of the gap portion is about 0.4 millimeters, the distance between the bottom of the bottom portion and the top of the IEE is about 2 millimeters, and the distance between the legs is about 3.2 millimeters.

Figure 6:
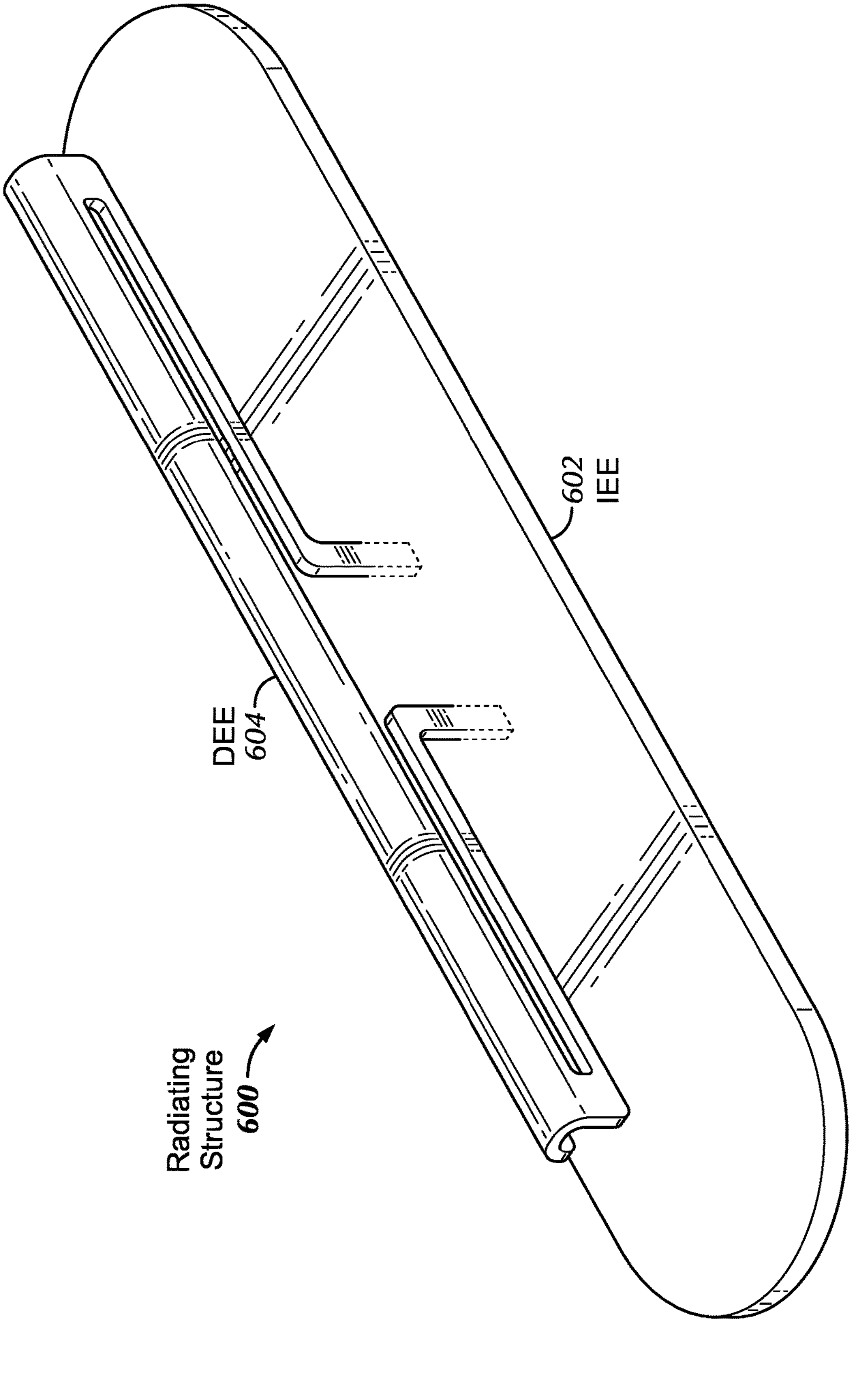
FIG. 6 shows an isometric view of a radiating structure in accordance with one or more embodiments of the invention.

FIG. 6 shows an isometric view of an embodiment of a radiating structure (600) that includes an IEE (602) and a DEE (604). In the present embodiment, the top portion of the DEE (604) includes a bend of about 180 degrees with a radius of curvature of about 0.25 millimeters.

As illustrated, the length of the top portion is the same as the length of the bottom portion, which is about 22 millimeters, the width of the top portion is about 0.8 millimeters, the width of the bottom portion is about 0.3 millimeters, the width of the gap portion is about 0.4 millimeters, the distance between the bottom of the bottom portion and the top of the IEE (602) is about 2 millimeters, and the distance between the legs is about 3.2 millimeters.

Figure 7:
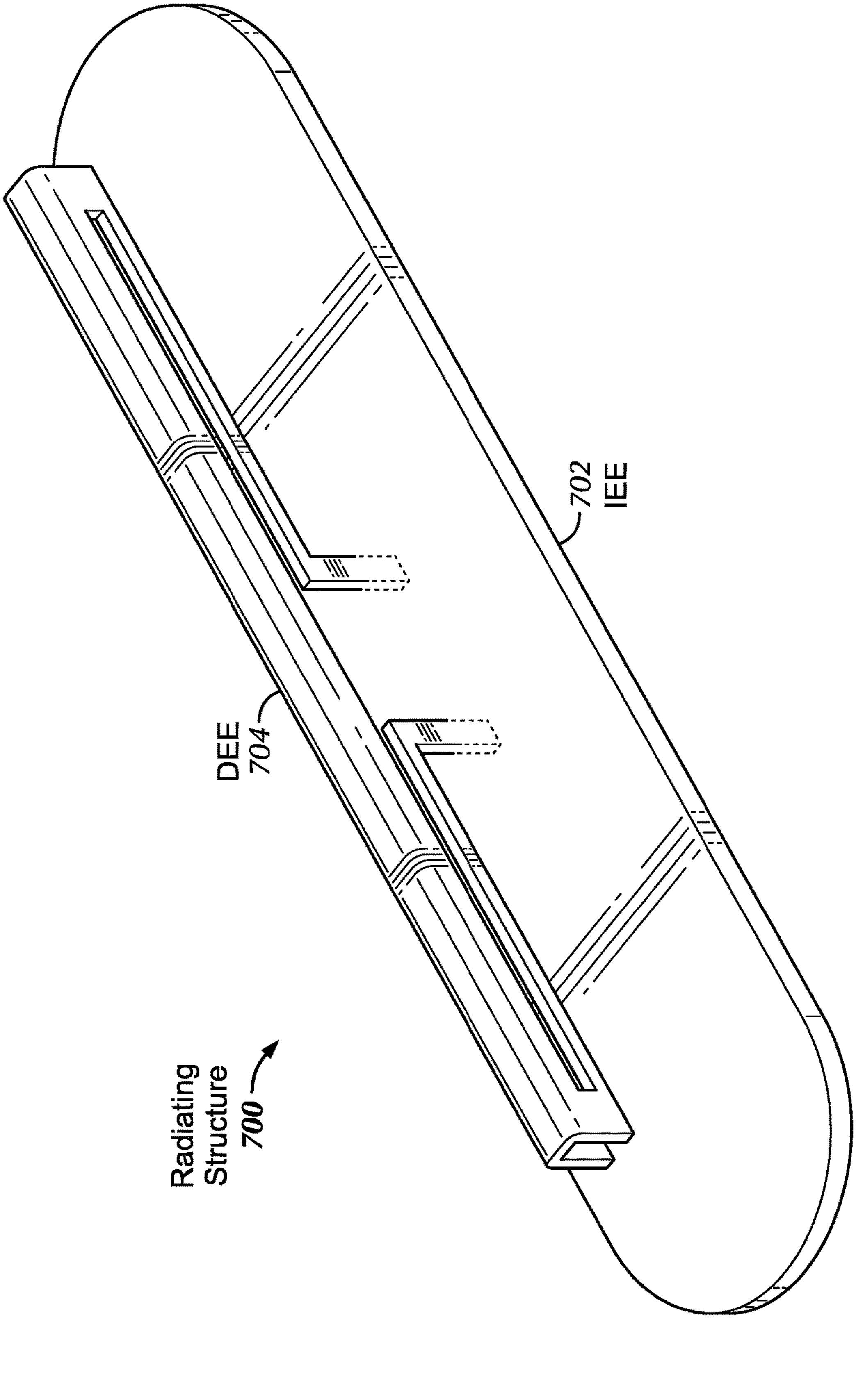
FIG. 7 shows an isometric view of a radiating structure in accordance with one or more embodiments of the invention.

FIG. 7 shows an isometric view of an embodiment of a radiating structure (700) that includes an IEE (702) and a DEE (704). In the present embodiment, the top portion of the DEE (704) includes a bend of about 180 degrees with a radius of curvature of about 0.25 millimeters. Further, the bent portion extends to a plane extending through the bottom of the bottom portion of the DEE (704). In one or more embodiments, the bent portion may extend partially toward the plane extending through the bottom of the bottom portion of the DEE (704) or further than the plane extending through the bottom of the bottom portion of the DEE (704).

As illustrated, the length of the top portion is the same as the length of the bottom portion, which is about 22 millimeters, the width of the top portion is about 0.75 millimeters, the width of the bottom portion is about 0.3 millimeters, the width of the gap portion is about 0.4 millimeters, the distance between the bottom of the bottom portion and the top of the IEE is about 2 millimeters, and the distance between the legs is about 3.2 millimeters.

Figure 8:
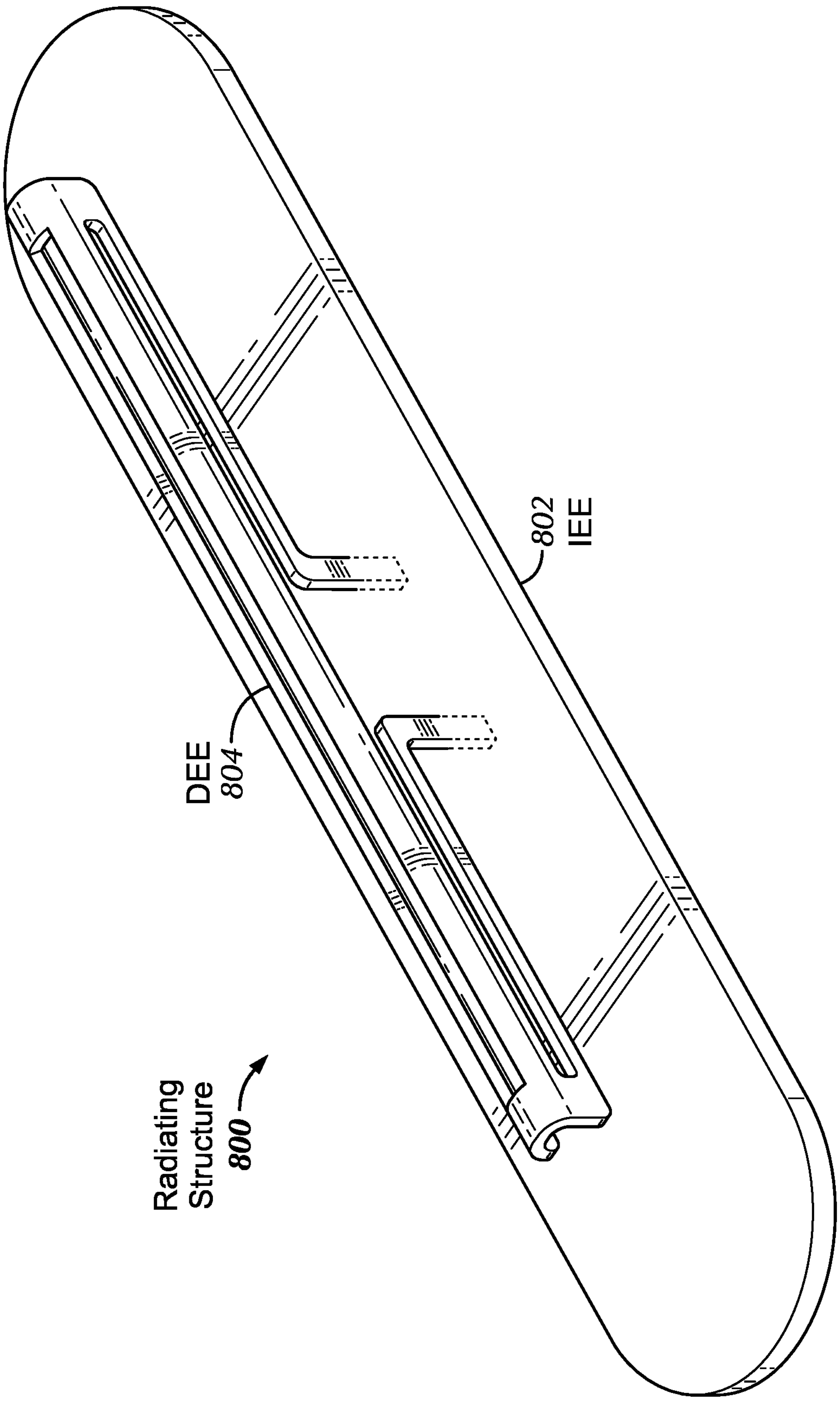
FIG. 8 shows an isometric view of a radiating structure in accordance with one or more embodiments of the invention.

FIG. 8 shows an isometric view of an embodiment of a radiating structure (800) that includes an IEE (802) and a DEE (804). In the present embodiment, the DEE (804) includes two gap portions. In one or more embodiments, the DEE (804) may include 3, 4, 5, 6, or more gap portions. In the present embodiment, one of the gap portions of the DEE (804) is wholly included in a bent portion of the DEE (804). In one or more embodiments, one or more gap portions may be partially included in the ben portion. Further, the present embodiment includes a bend of about 180 degrees with a radius of curvature of about 0.25 millimeters.

As illustrated, the length of the top portion is the same as the length of the bottom portion, which is about 22 millimeters, the width of the top portion is about 0.7 millimeters, the width of the bottom portion is about 0.3 millimeters, the width of the gap portion is about 0.4 millimeters, the distance between the bottom of the bottom portion and the top of the IEE is about 2 millimeters, and the distance between the legs is about 3.2 millimeters.

Figure 9:
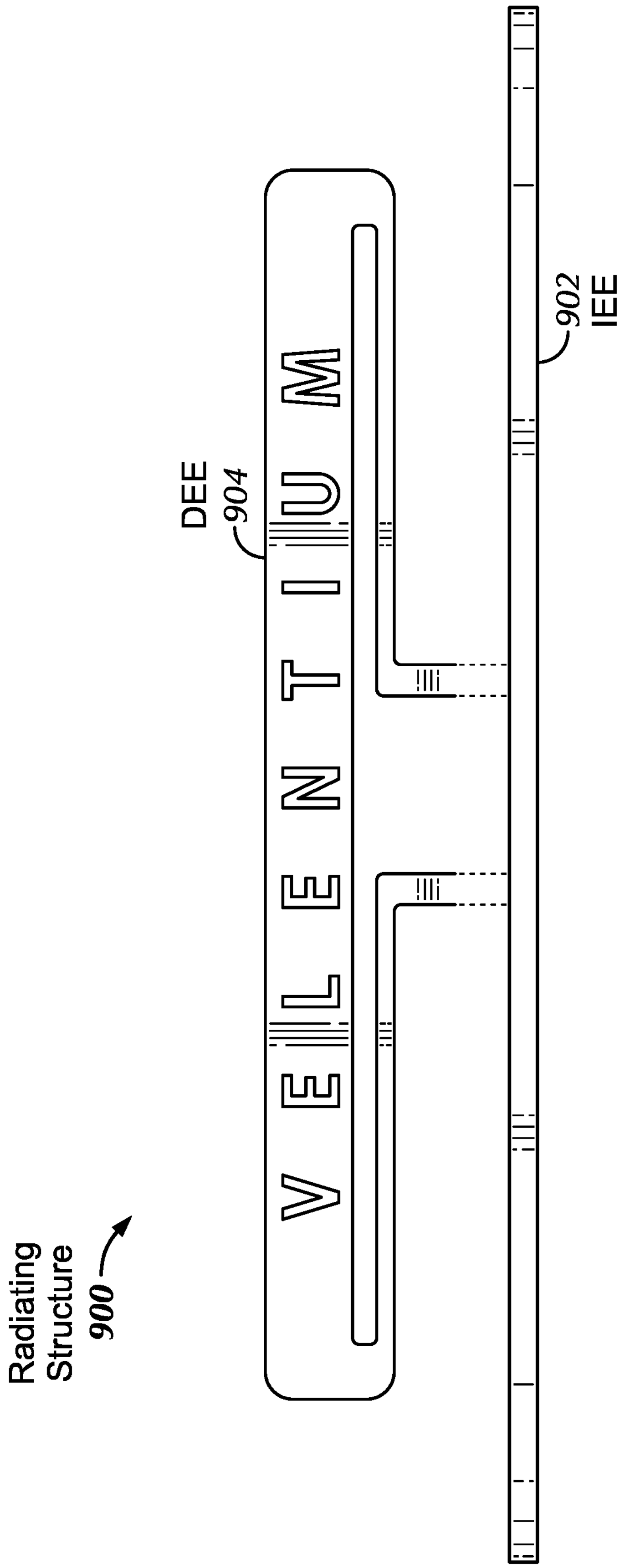
FIG. 9 shows a front view of a radiating structure in accordance with one or more embodiments of the invention.

FIG. 9 shows a side view of an embodiment of a radiating structure (900) that includes an IEE (902) and a DEE (904) that may be considered planar. In the present embodiment, the DEE (904) includes a cutout to provide textual information in the design of the DEE (904) without affecting the properties of the DEE (904). For example, the textual information may provide manufacturer information, technical specification information, orientation information, or any other information.

As illustrated, the length of the top portion is the same as the length of the bottom portion, which is about 22 millimeters, the width of the top portion is about 1.6 millimeters, the width of the bottom portion is about 0.3 millimeters, the width of the gap portion is about 0.4 millimeters, the distance between the bottom of the bottom portion and the top of the IEE is about 2 millimeters, and the distance between the legs is about 3.2 millimeters.

Figure 10:
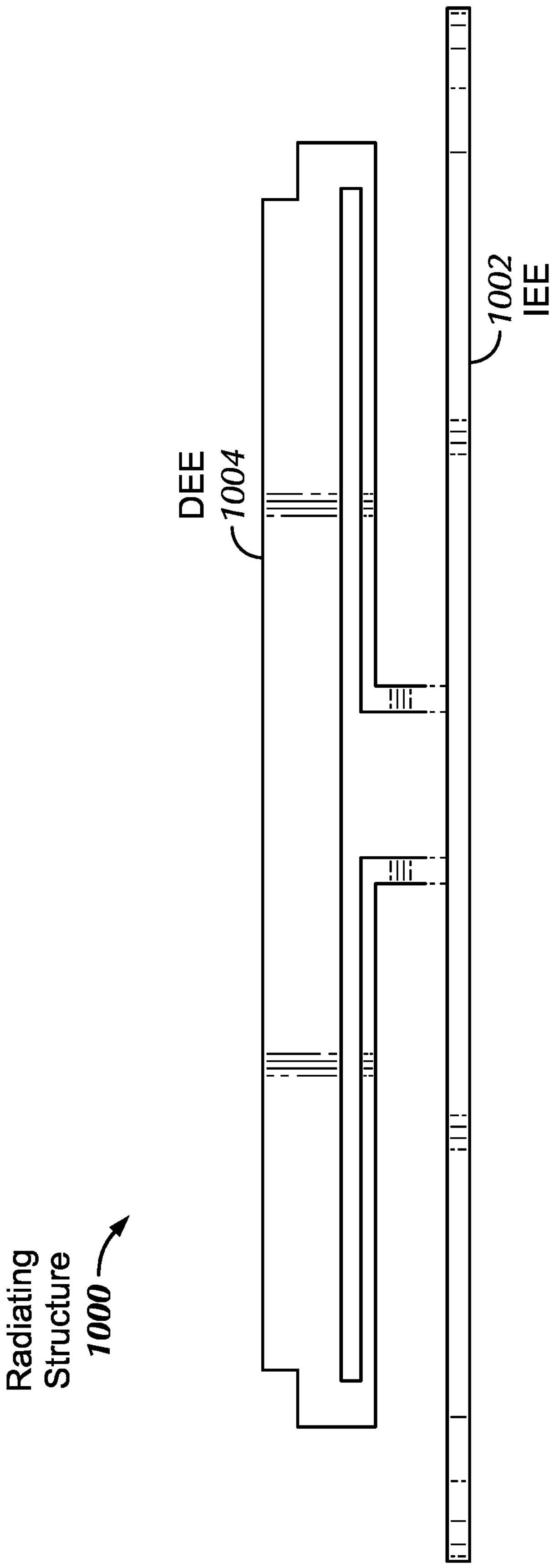
FIG. 10 shows a front view of a radiating structure in accordance with one or more embodiments of the invention.

FIG. 10 shows a side view of an embodiment of a radiating structure (1000) that includes an IEE (1002) and a DEE (1004). In the present embodiment, the DEE (1004) includes a top portion with a step pattern along its edge. In one or more embodiments, the top portion of the DEE (1004) may include any number of steps including 2, 3, 4, 5, 6, or more steps.

As illustrated, the length of the top portion is the same as the length of the bottom portion, which is about 28.5 millimeters, the width of the top portion is about 1.8 millimeters, the width of the bottom portion is about 0.3 millimeters, the width of the gap portion is about 0.4 millimeters, the distance between the bottom of the bottom portion and the top of the IEE is about 1.6 millimeters, and the distance between the legs is about 3.2 millimeters.

Figure 11:
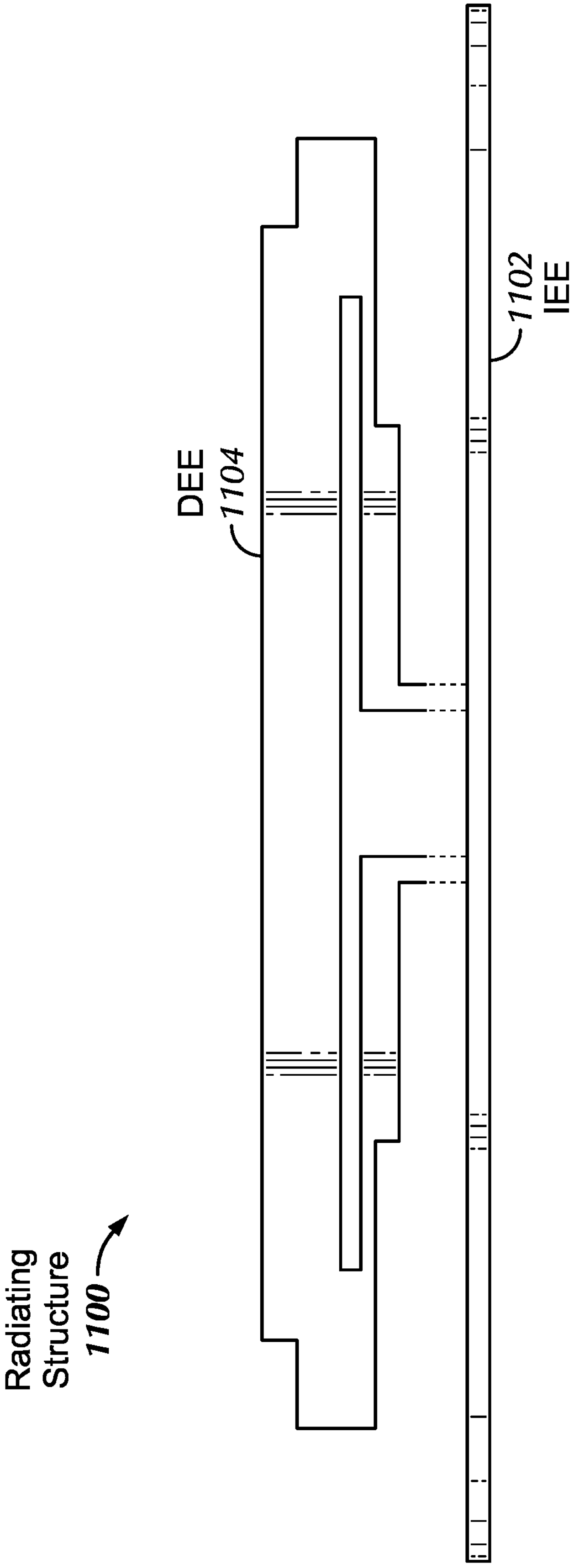
FIG. 11 shows a front view of a radiating structure in accordance with one or more embodiments of the invention.

FIG. 11 shows a side view of an embodiment of a radiating structure (1100) that includes an IEE (1102) and a DEE (1104). In the present embodiment, the DEE (1104) includes a bottom portion with a step pattern along its edge. In one or more embodiments, the bottom portion of the DEE (1104) may include any number of steps including 2, 3, 4, 5, 6, or more steps.

As illustrated, the length of the top portion is the same as the length of the bottom portion, which is about 29 millimeters, the width of the top portion is about 1.8 millimeters, the width of the bottom portion is about 0.9 millimeters, the width of the gap portion is about 0.4 millimeters, the distance between the bottom of the bottom portion and the top of the IEE is about 1.5 millimeters, and the distance between the legs is about 3.2 millimeters.

Figure 12:
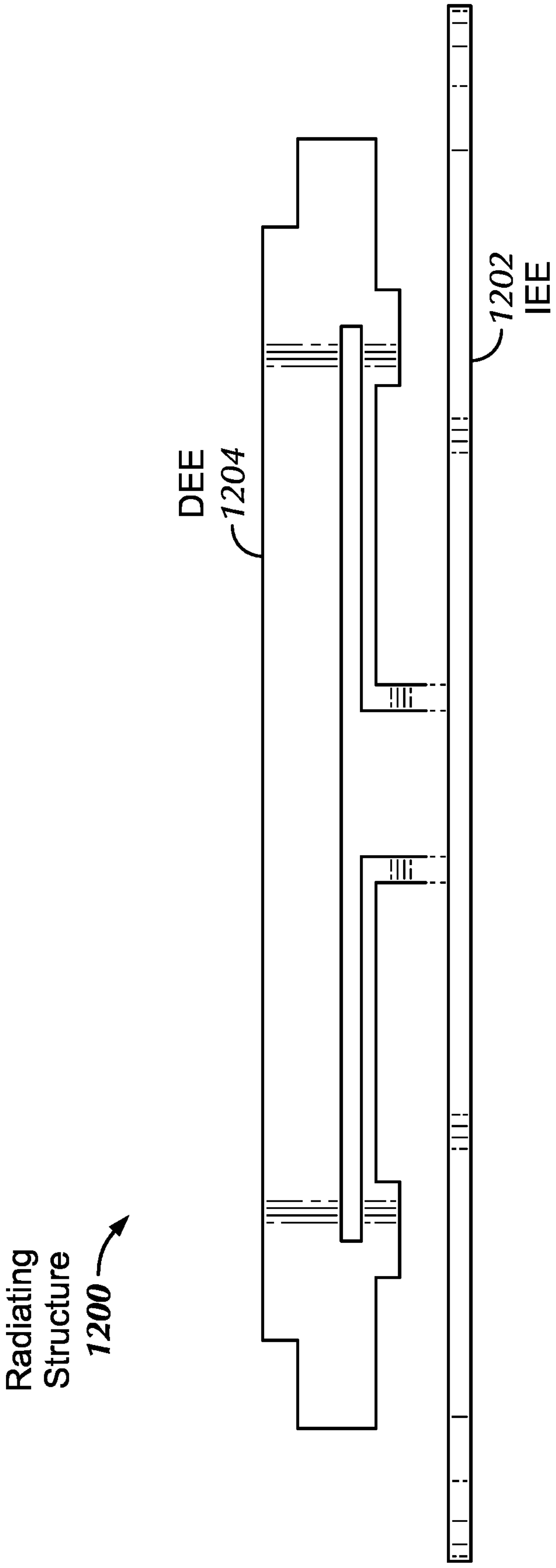
FIG. 12 shows a front view of a radiating structure in accordance with one or more embodiments of the invention.

FIG. 12 shows a side view of an embodiment of a radiating structure (1200) that includes an IEE (1202) and a DEE (1204). In the present embodiment, the DEE (1204) includes a bottom portion with a notch along its edge. In one or more embodiments, the bottom portion of the DEE (1204) may include any number of notches including 2, 3, 4, 5, 6, or more steps.

As illustrated, the length of the top portion is the same as the length of the bottom portion, which is about 29 millimeters, the width of the top portion is about 1.8 millimeters, the width of the bottom portion is about 0.3 millimeters, the width of the gap portion is about 0.4 millimeters, the distance between the bottom of the bottom portion and the top of the IEE is about 1.6 millimeters, and the distance between the legs is about 3.2 millimeters.

Figure 13:
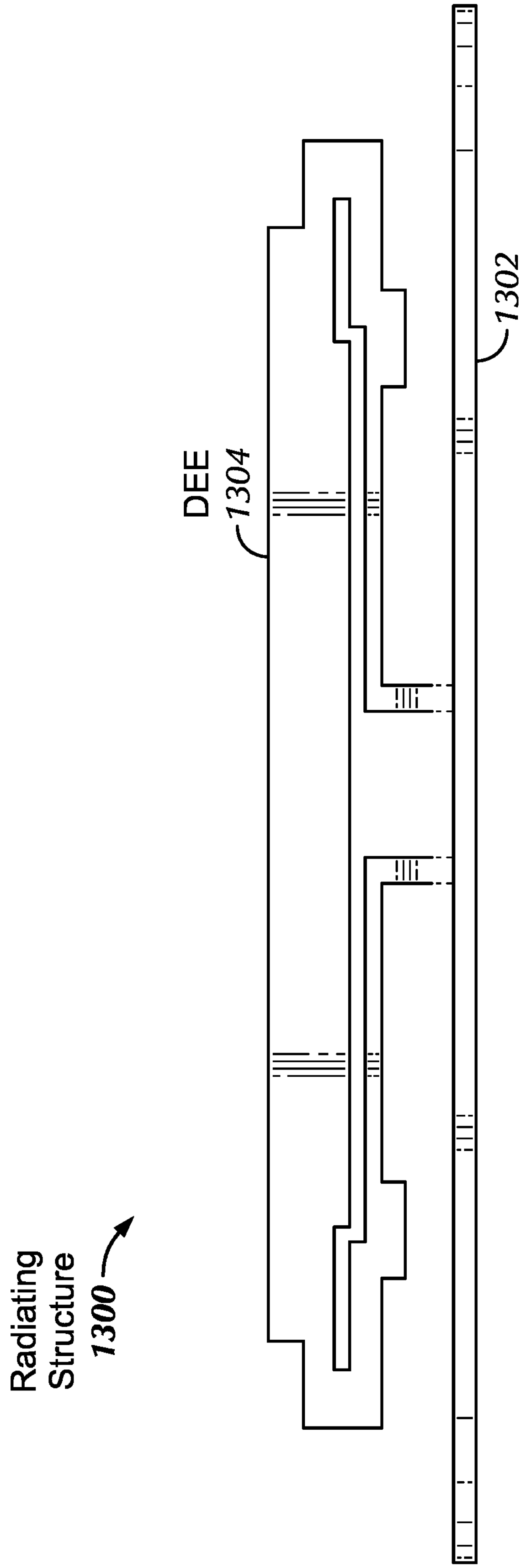
FIG. 13 shows a front view of a radiating structure in accordance with one or more embodiments of the invention.

FIG. 13 shows a side view of an embodiment of a radiating structure (1300) that includes an IEE (1302) and a DEE (1304). In the present embodiment, the DEE (1304) includes a bottom portion with a notch along its edge. Further, in the present embodiment, the gap portion includes a step pattern. In one or more embodiments, the gap portion may include 2, 3, 4, 5, 6, or more steps.

As illustrated, the length of the top portion is the same as the length of the bottom portion, which is about 29 millimeters, the width of the top portion is about 1.8 millimeters, the width of the bottom portion is about 0.3 millimeters, the width of the gap portion is about 0.3 millimeters, the distance between the bottom of the bottom portion and the top of the IEE is about 1.6 millimeters, and the distance between the legs is about 3.2 millimeters.

Figure 14:
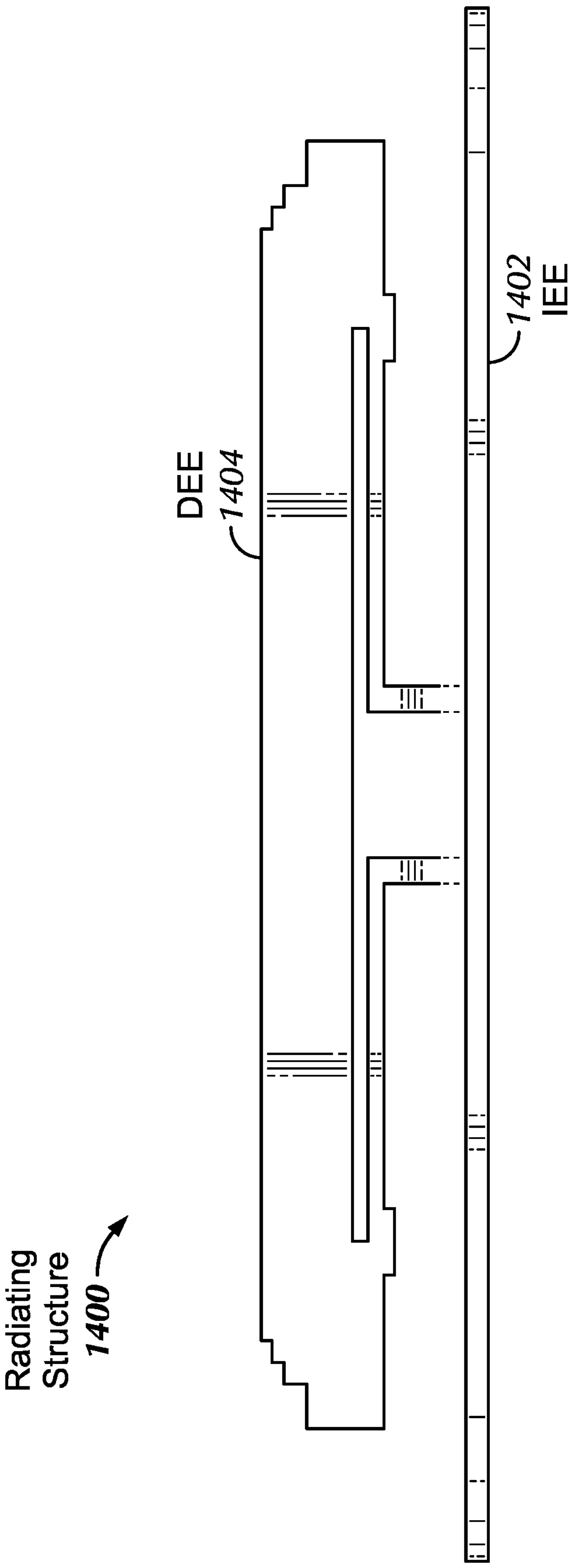
FIG. 14 shows a front view of a radiating structure in accordance with one or more embodiments of the invention.

FIG. 14 shows a side view of an embodiment of a radiating structure (1400) that includes an IEE (1402) and a DEE (1404). In the present embodiment, the DEE (1404) includes a bottom portion with a notch along its edge. Further, in the present embodiment, the top portion includes 3 steps along its edge.

As illustrated, the length of the top portion is the same as the length of the bottom portion, which is about 29 millimeters, the width of the top portion is about 2 millimeters, the width of the bottom portion is about 0.3 millimeters, the width of the gap portion is about 0.3 millimeters, the distance between the bottom of the bottom portion and the top of the IEE is about 1.7 millimeters, and the distance between the legs is about 3.2 millimeters.

Figure 15:
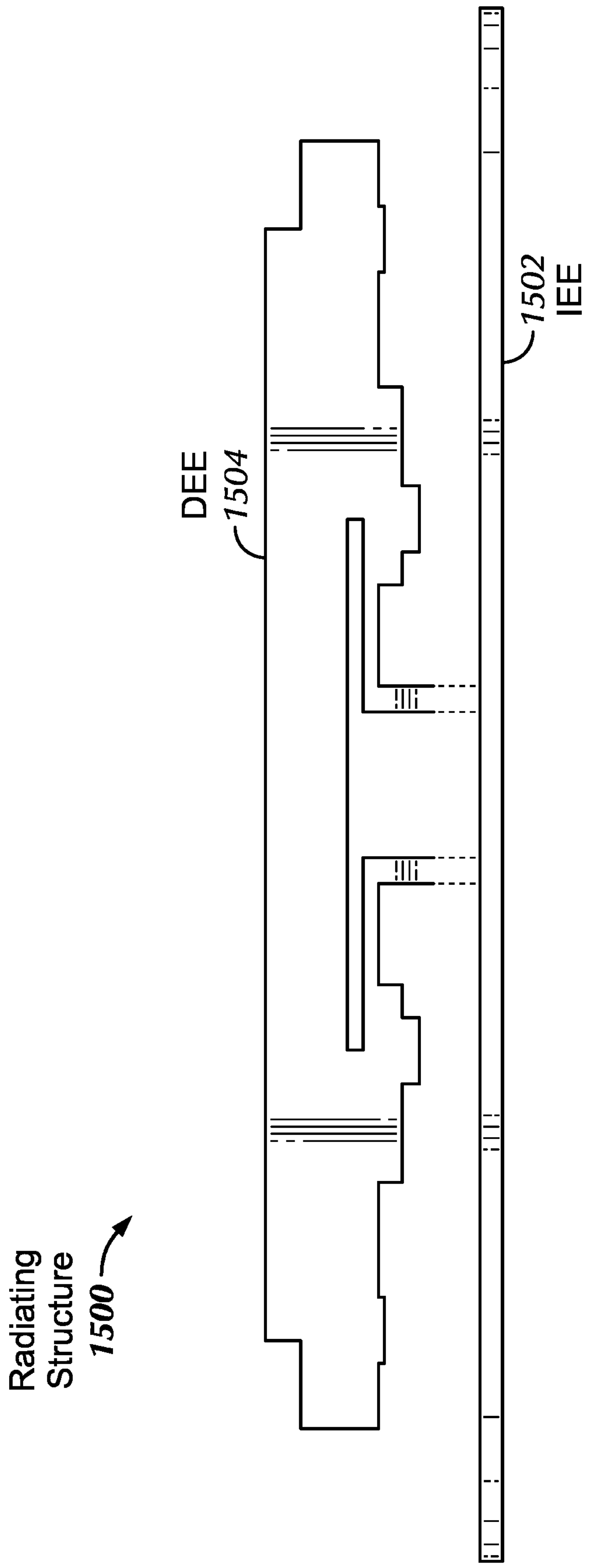
FIG. 15 shows a front view of a radiating structure in accordance with one or more embodiments of the invention.

FIG. 15 shows a side view of an embodiment of a radiating structure (1500) that includes an IEE (1502) and a DEE (1504). In the present embodiment, the DEE (1504) includes a bottom portion with multiple notches along its edge, with one of the notches having an additional notch along its edge to create a step pyramid pattern. Further, in the present embodiment, the top portion includes a step along its edge.

As illustrated, the length of the top portion is the same as the length of the bottom portion, which is about 29 millimeters, the width of the top portion is about 1.8 millimeters, the width of the bottom portion is about 0.3 millimeters, the width of the gap portion is about 0.3 millimeters, the distance between the bottom of the bottom portion and the top of the IEE is about 2.2 millimeters, and the distance between the legs is about 3.2 millimeters.

Figure 16:
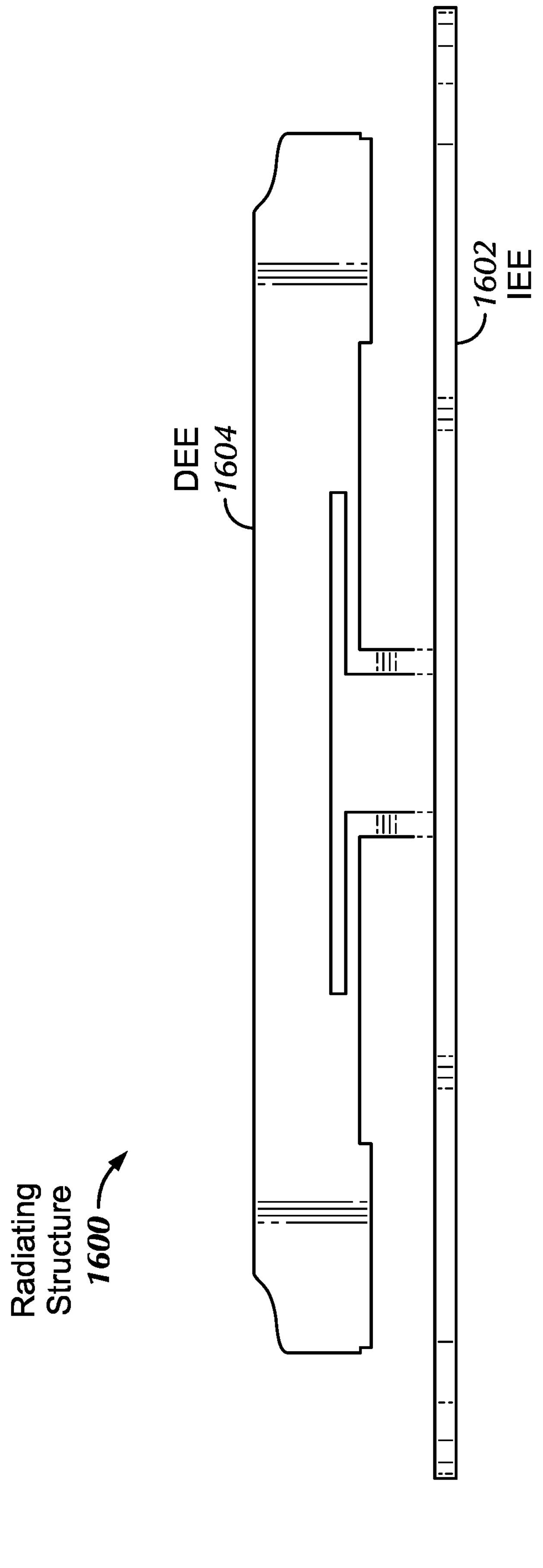
FIG. 16 shows a front view of a radiating structure in accordance with one or more embodiments of the invention.

FIG. 16 shows a side view of an embodiment of a radiating structure (1600) that includes an IEE (1602) and a DEE (1604). In the present embodiment, the DEE (1604) includes a bottom portion with a notch along its edge. Further, in the present embodiment, the top portion includes a step along its edge with the step being rounded. In one or more embodiments, the steps can be rounded, filleted or slanted, or any combination thereof.

As illustrated, the length of the top portion is the same as the length of the bottom portion, which is about 29 millimeters, the width of the top portion is about 1.8 millimeters, the width of the bottom portion is about 0.3 millimeters, the width of the gap portion is about 0.3 millimeters, the distance between the bottom of the bottom portion and the top of the IEE is about 2.2 millimeters, and the distance between the legs is about 3.2 millimeters.

Figure 17:
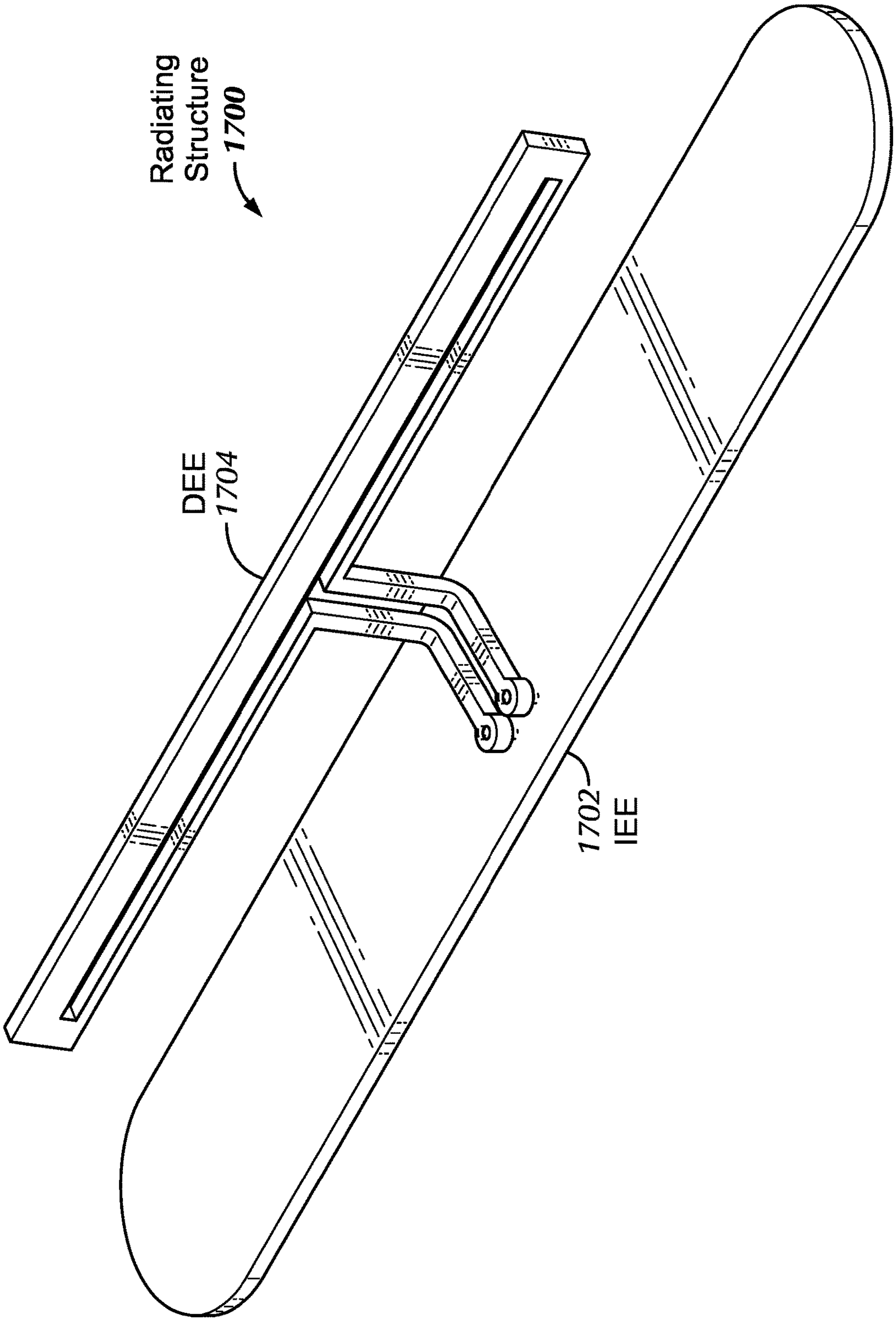
FIG. 17 shows an isometric view of a radiating structure in accordance with one or more embodiments of the invention.

FIG. 17 shows a side view of an embodiment of a radiating structure (1700) that includes an IEE (1702) and a DEE (1704). In the present embodiment, the legs of the DEE (1704) include a bent portion such that the legs extend at an angle from the bottom portion of the DEE (1704) toward the IEE (1702), and then bend such that the legs run parallel along at least a portion of the IEE (1702). Further, in the present embodiment, each leg includes an aperture through which a connector or feedthrough pin may pass. Further, in the present embodiment, the angle of the bend is about 100 degrees. In one or more embodiments, the angle of the bend may be 60, 70, 80, 90, 100, 110, 120, 130, 140, or 150 degrees or any angle between 60 and 150 degrees. Further, in the present embodiment, the legs include one bend. In one or more embodiments, the legs may include 2, 3, 4, 5, 6, or more bends.

As illustrated, the length of the top portion is the same as the length of the bottom portion, which is about 32 millimeters, the width of the top portion is about 1 millimeter, the width of the bottom portion is about 0.4 millimeters, the width of the gap portion is about 0.4 millimeters, the distance between the bottom of the bottom portion and the top of the IEE is about 3.8 millimeters, and the distance between the legs is about 0.8 millimeters.

Figure 18:
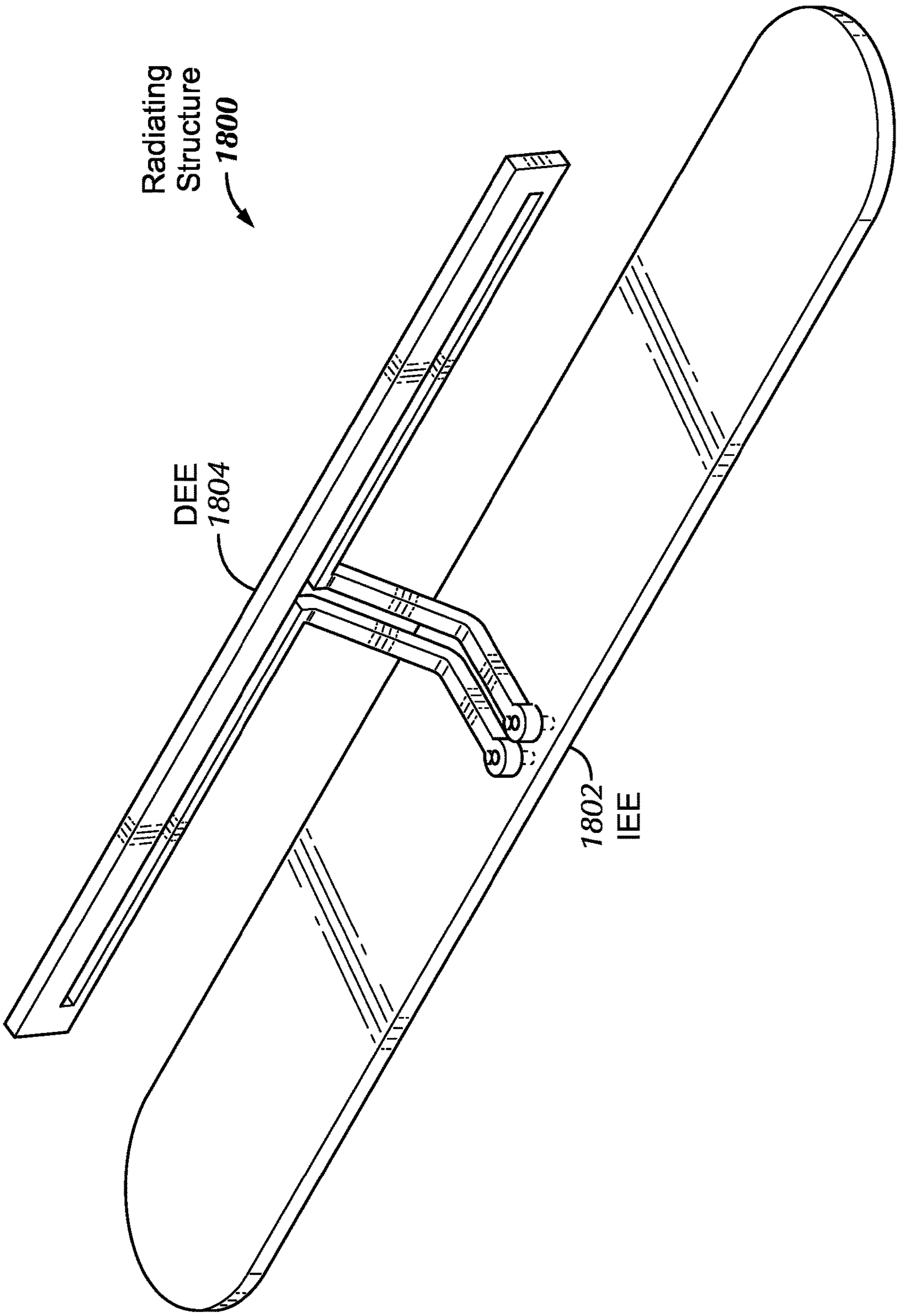
FIG. 18 shows an isometric view of a radiating structure in accordance with one or more embodiments of the invention.

FIG. 18 shows a side view of an embodiment of a radiating structure (1800) that includes an IEE (1802) and a DEE (1804). In the present embodiment, the legs of the DEE (1804) include two bent portions such that the legs extend at an angle from the bottom portion of the DEE (1804) toward the IEE (1802), and then bend such that the legs run parallel along at least a portion of the IEE (1802). Further, the legs include a second bend proximate to the bottom portion of the DEE (1804) such that a plane extending through the top portion, the gap portion, and the bottom portion of the DEE (1804) is orthogonal to the IEE (1802).

As illustrated, the length of the top portion is the same as the length of the bottom portion, which is about 32 millimeters, the width of the top portion is about 1 millimeter, the width of the bottom portion is about 0.3 millimeters, the width of the gap portion is about 0.4 millimeters, the distance between the bottom of the bottom portion and the top of the IEE is about 4.3 millimeters, and the distance between the legs is about 0.8 millimeters.

Figure 19:
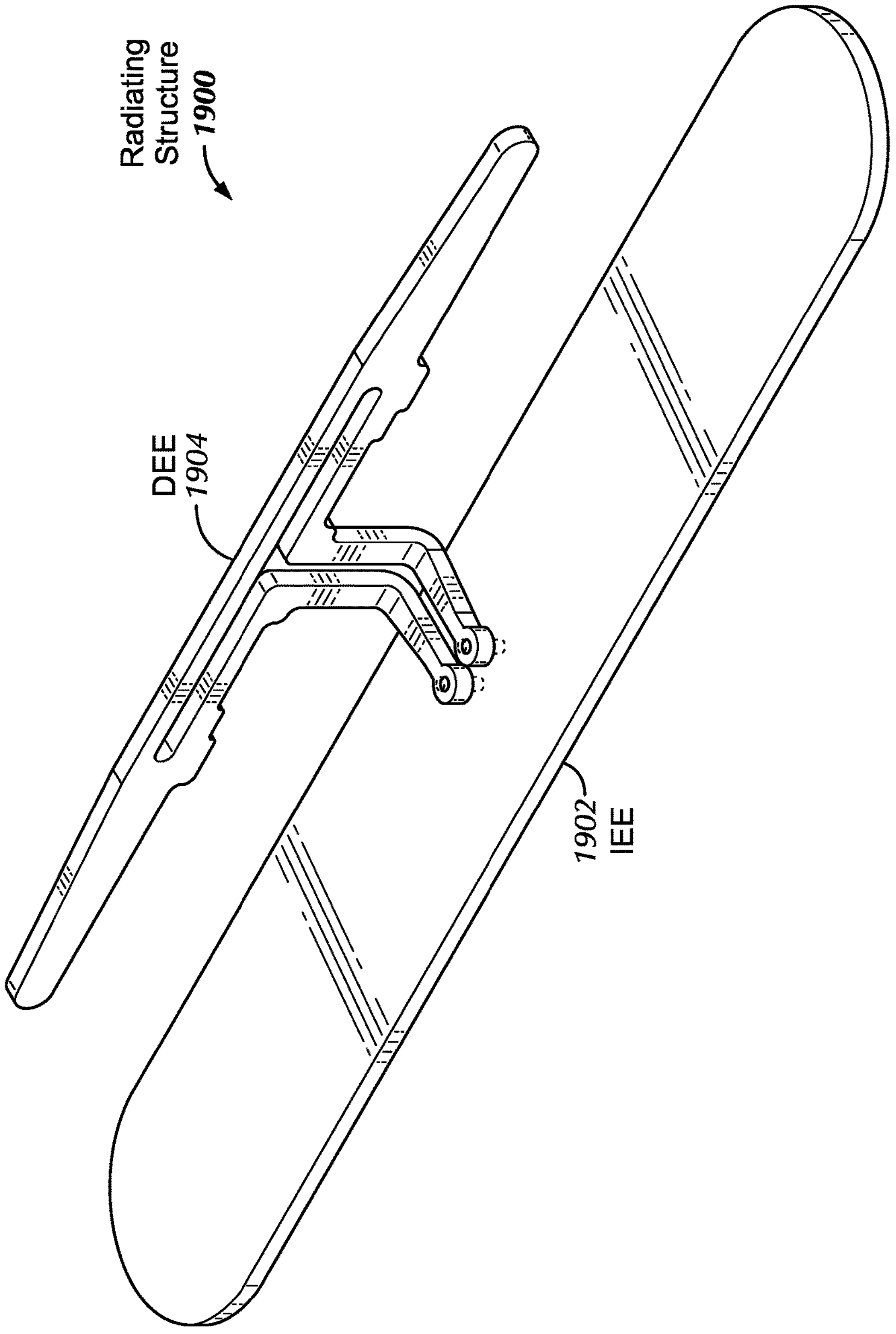
FIG. 19 shows an isometric view of a radiating structure in accordance with one or more embodiments of the invention.

FIG. 19 shows a side view of an embodiment of a radiating structure (1900) that includes an IEE (1902) and a DEE (1904). In the present embodiment, the legs of the DEE (1904) include a bent portion such that the legs extend at an angle from the bottom portion of the DEE (1904) toward the IEE (1902), and then bend such that the legs run parallel along at least a portion of the IEE (1902). Further, the bottom portion includes a notch portion. Further, in the present embodiment, the longitudinal edges of the top and bottom portions of the DEE (1904) are rounded. In one or more embodiments, the edges of the DEE (1904) may be rounded, chamfered, filleted, or slanted. Further, in the present embodiment, the top portion includes a bend along its top edge.

As illustrated, the length of the top portion is the same as the length of the bottom portion, which is about 28.7 millimeters, the width of the top portion is about 0.5 millimeters, the width of the bottom portion is about 0.5 millimeters, the width of the gap portion is about 0.5 millimeters, the distance between the bottom of the bottom portion and the top of the IEE is about 4.2 millimeters, and the distance between the legs is about 0.8 millimeters.

Figure 20:
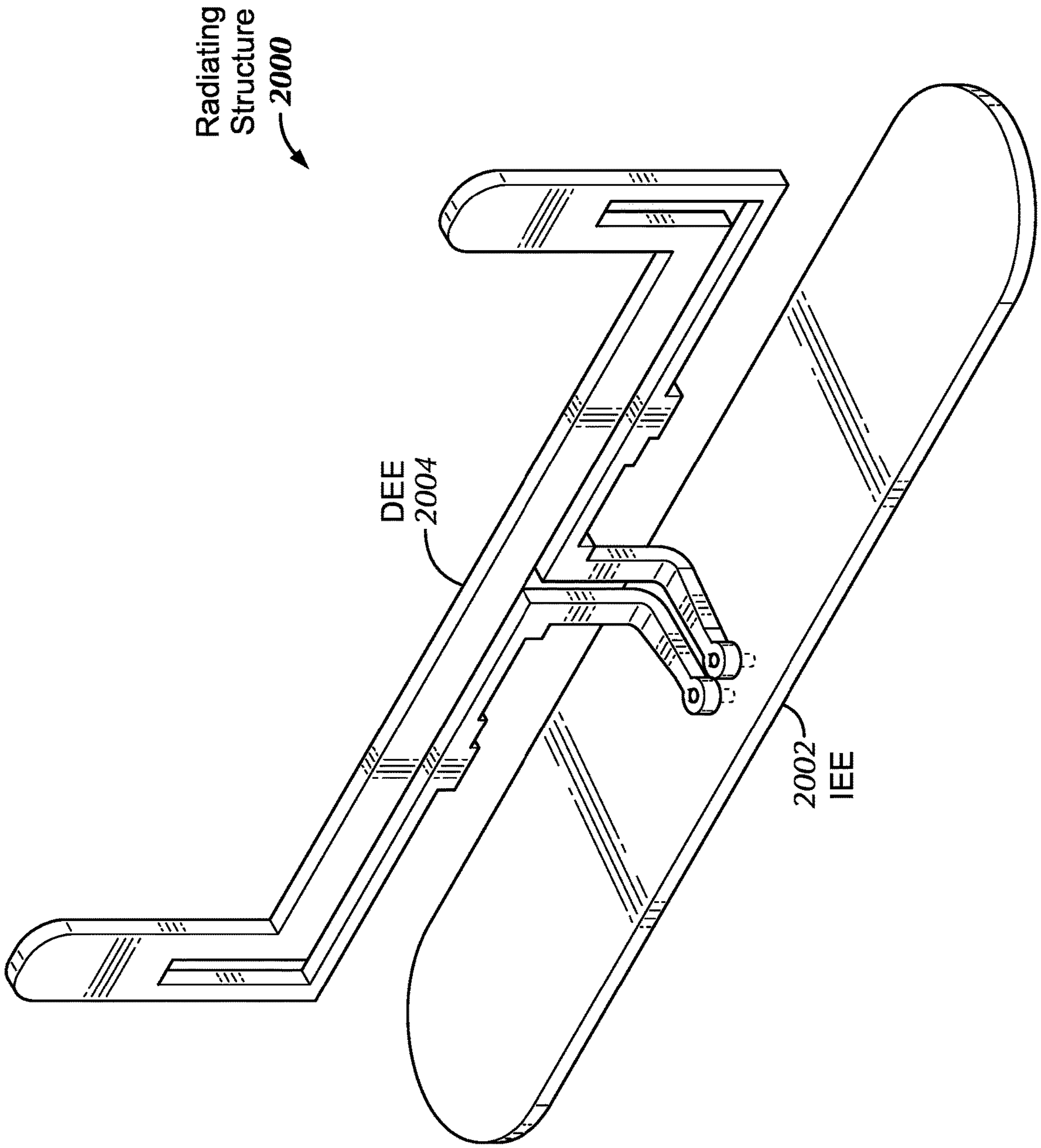
FIG. 20 shows an isometric view of a radiating structure in accordance with one or more embodiments of the invention.

FIG. 20 shows a side view of an embodiment of a radiating structure (2000) that includes an IEE (2002) and a DEE (2004). In the present embodiment, the legs of the DEE (2004) include a bent portion such that the legs extend at an angle from the bottom portion of the DEE (2004) toward the IEE (2002), and then bend such that the legs run parallel along at least a portion of the IEE (2002). Further, the bottom portion includes a notch portion. Further, in the present embodiment, the longitudinal length of the DEE (2004) includes a bend such that the ends of the top portion, gap portion, and bottom portion bend upward and away from the IEE. In the present embodiment, the bend is 90 degrees. In one or more embodiments, the bend may be 60, 70, 80, 90, 100, 110, or 120 degrees or any angle between 60 and 120 degrees.

As illustrated, the length of the top portion is the same as the length of the bottom portion, which is about 29.2 millimeters, the width of the top portion is about 1.4 millimeters, the width of the bottom portion is about 0.5 millimeters, the width of the gap portion is about 0.5 millimeters, the distance between the bottom of the bottom portion and the top of the IEE is about 4.2 millimeters, and the distance between the legs is about 0.8 millimeters.

Figure 21:
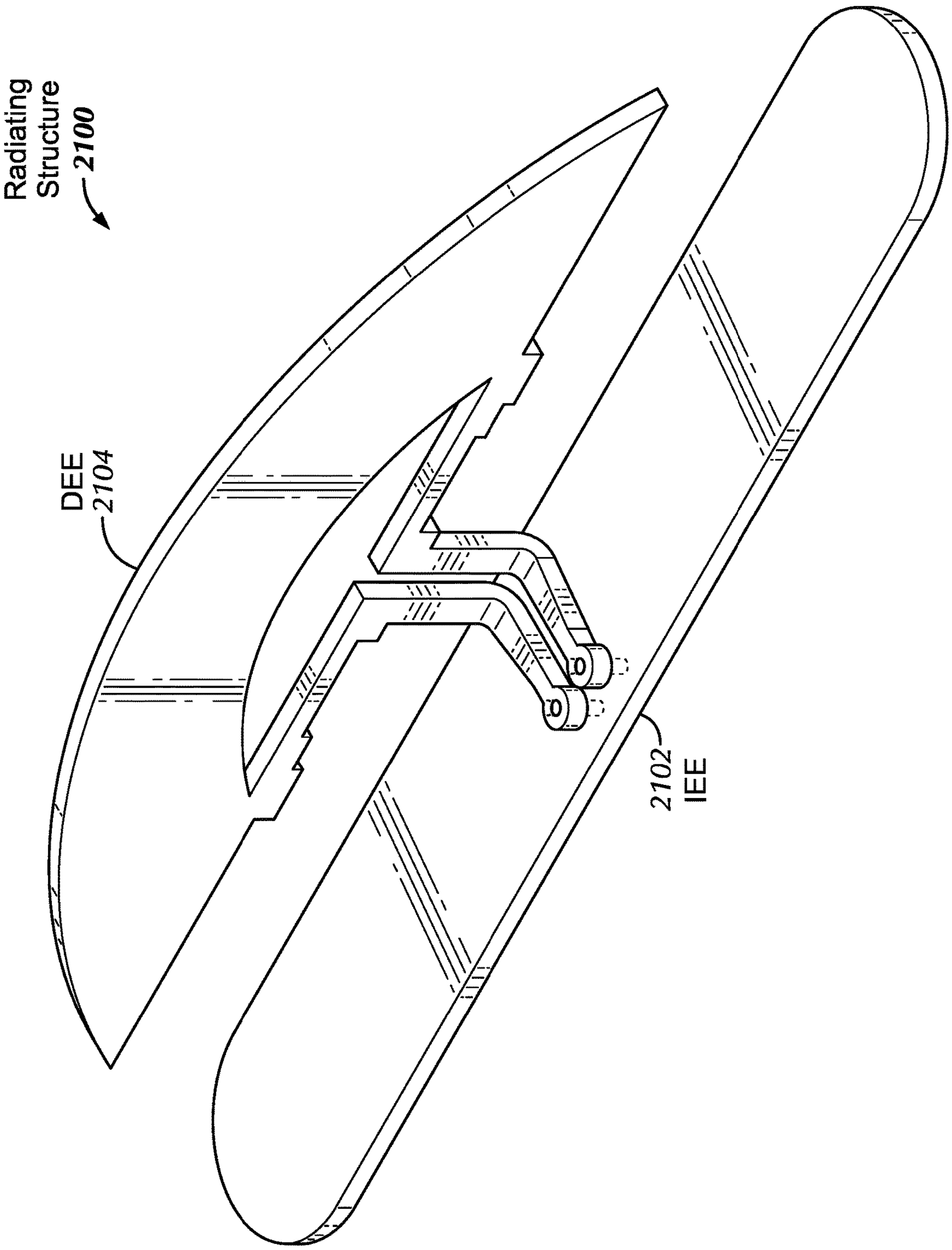
FIG. 21 shows an isometric view of a radiating structure in accordance with one or more embodiments of the invention.

FIG. 21 shows a side view of an embodiment of a radiating structure (2100) that includes an IEE (2102) and a DEE (2104). In the present embodiment, the legs of the DEE (2104) include a bent portion such that the legs extend at an angle from the bottom portion of the DEE (2104) toward the IEE (2102), and then bend such that the legs run parallel along at least a portion of the IEE (2102). Further, the bottom portion includes a notch portion. Further, in the present embodiment, the longitudinal length of the top portion of the DEE (2004) is rounded along its entire length. In one or more embodiments, the top portion may be rounded along a portion of its length, include 10, 20, 30, 40, 50, 60, 70, 80, 90, or 100 percent, or any portion between 10 and 100 percent.

As illustrated, the length of the top portion is the same as the length of the bottom portion, which is about 29.2 millimeters, the width of the bottom portion is about 0.5 millimeters, the distance between the bottom of the bottom portion and the top of the IEE is about 4.2 millimeters, and the distance between the legs is about 0.8 millimeters.

Figure 22:
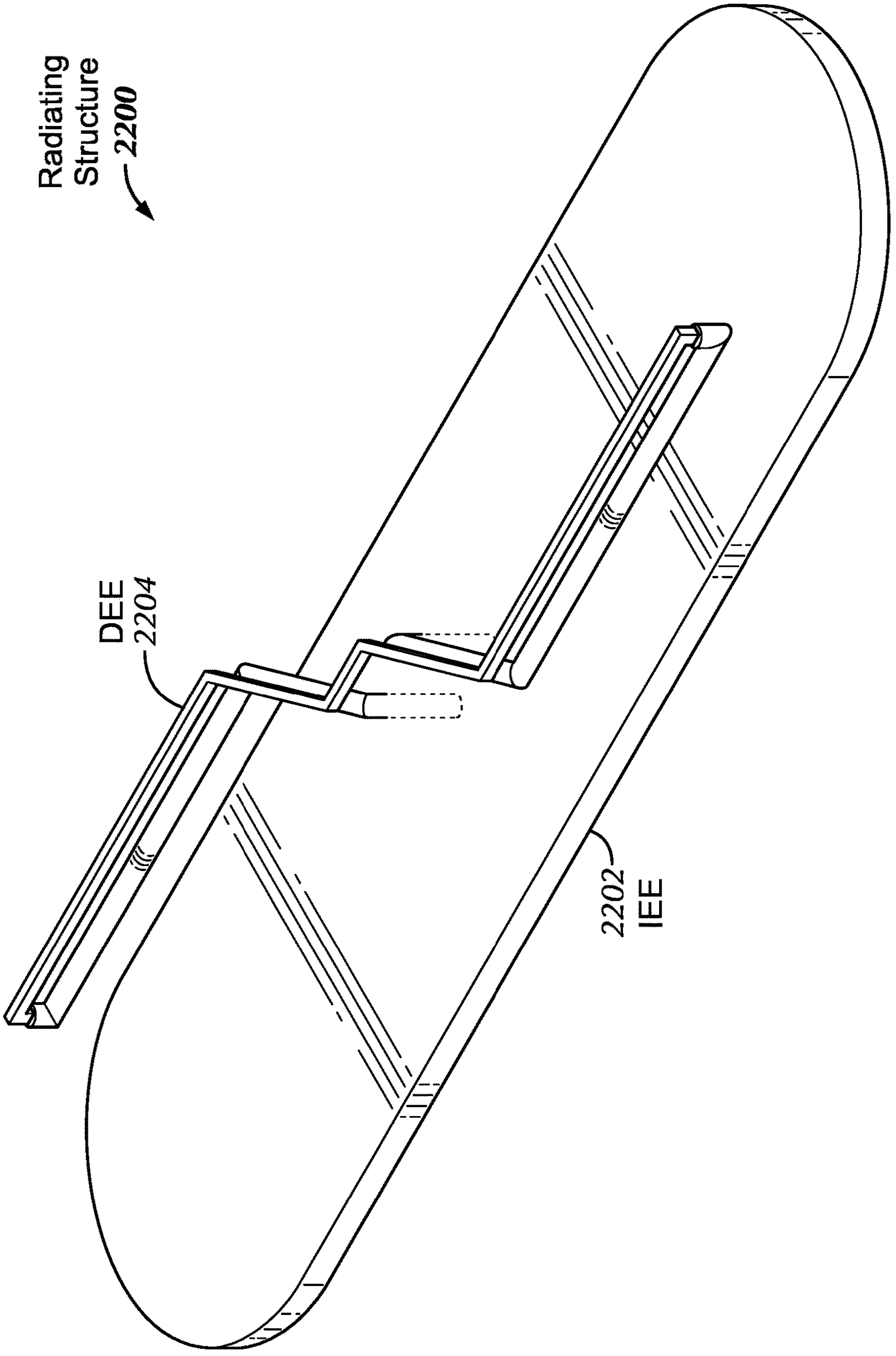
FIG. 22 shows an isometric view of a radiating structure in accordance with one or more embodiments of the invention.

FIG. 22 shows a side view of an embodiment of a radiating structure (2200) that includes an IEE (2202) and a DEE (2204). In the present embodiment, the DEE (2204) includes multiple bends along its length. Further, the top portion of the DEE (2204) is constructed from a sheet metal material and the bottom portion of the DEE (2204) is constructed from a wire metal material. In one or more embodiments, the DEE portion may be constructed from any combination of sheet metal and wire metal.

As illustrated, the length of the top portion is the same as the length of the bottom portion, which is about 21 millimeters, the width of the top portion is about 0.2 millimeters, the width of the bottom portion is about 0.2 millimeters, the width of the gap portion is about 0.4 millimeters, the distance between the bottom of the bottom portion and the top of the IEE is about 1.4 millimeters, and the distance between the legs is about 1.2 millimeters.

Figure 23:
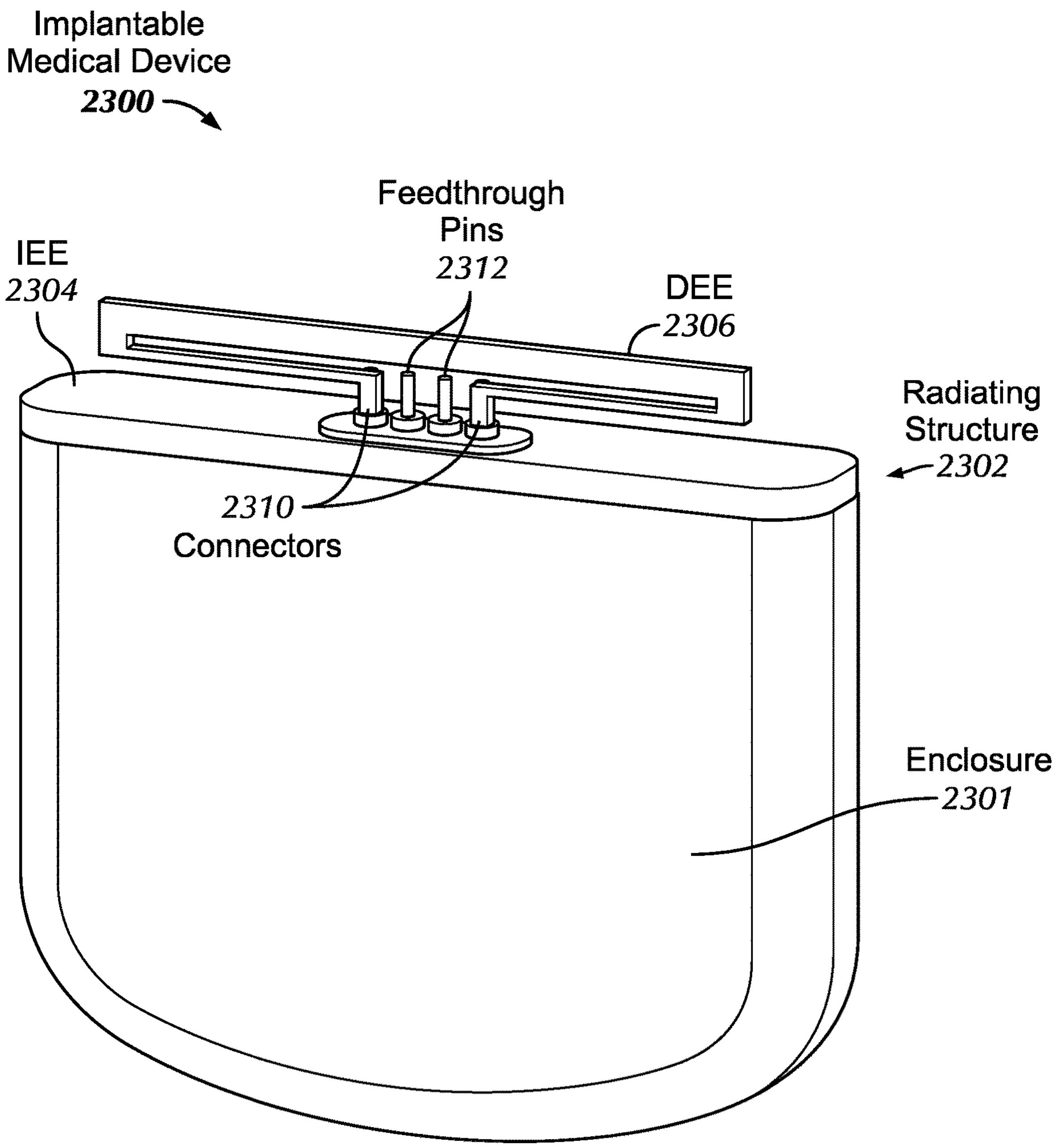
FIG. 23 shows an isometric view of an implantable medical device in accordance with one or more embodiments of the invention.

FIG. 23 shows an isometric view of an embodiment of an implantable medical device (2300) similar to the embodiment illustrated in FIG. 1. In the present embodiment, the feedthrough pins (2312) passing through the IEE (2304) from the enclosure (2301) are located between the legs of the DEE (2306). To accommodate this difference, the legs of the DEE (2306) are spaced further apart as compared to the embodiment illustrated in FIG. 1. Further, the arrangement of conduits in the IEE (2304) remains the same as in FIG. 1. As such, the embodiment illustrated in FIG. 23 illustrates that the same IEE (2304) and enclosure (2301) can accommodate different DEE and feedthrough pin arrangements. Further, the present embodiment illustrates 2 feedthrough pins (2312). In one or more embodiments, the number of feedthrough pins may include 1, 2, 3, 4, 5, 6, 8, 10, 12, 14, 16, or more feedthrough pins.

Figure 24:
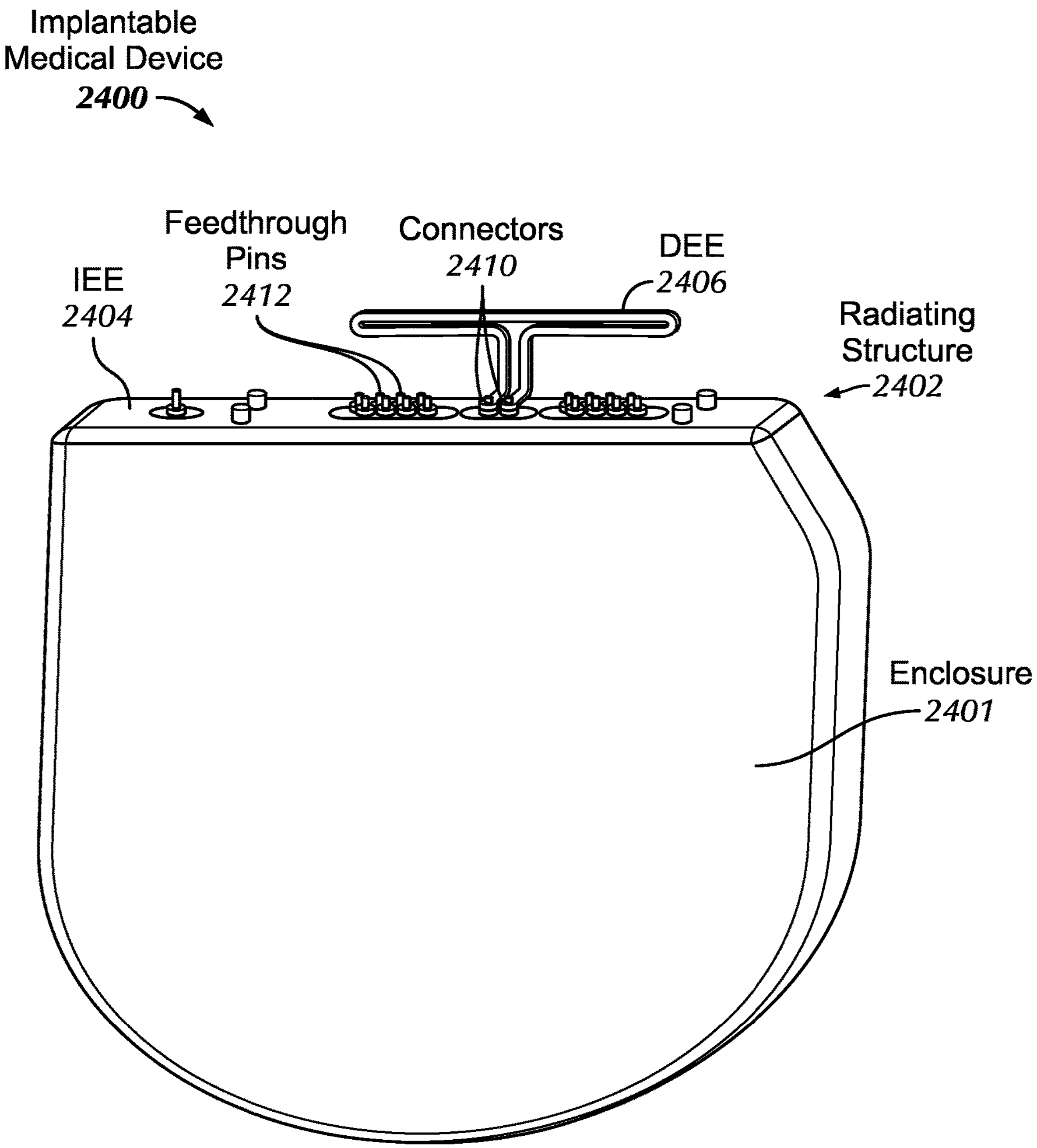
FIG. 24 shows an isometric view of an implantable medical device in accordance with one or more embodiments of the invention.

FIG. 24 shows an isometric view of an embodiment of an implantable medical device (2400). In the present embodiment, the feedthrough pins (2412) passing through the IEE (2404) from the enclosure (2401) are located in two banks of feedthrough pins (2412). Each bank of feedthrough pins (2412) includes 8 feedthrough pins (2412). In one or more embodiments, the implantable medical device (2400) includes 1, 2, 3, 4, 5, 6, or more banks of feedthrough pins. Further, in one or more embodiments, the implantable medical device (2400) includes 1, 2, 3, 4, 5, 6, 7, 8, 9, 10, or more feedthrough pins per bank. Further, the present embodiment illustrates a DEE (2406) that includes bent legs that are electrically coupled to circuitry within the enclosure (2401).

Figure 25:
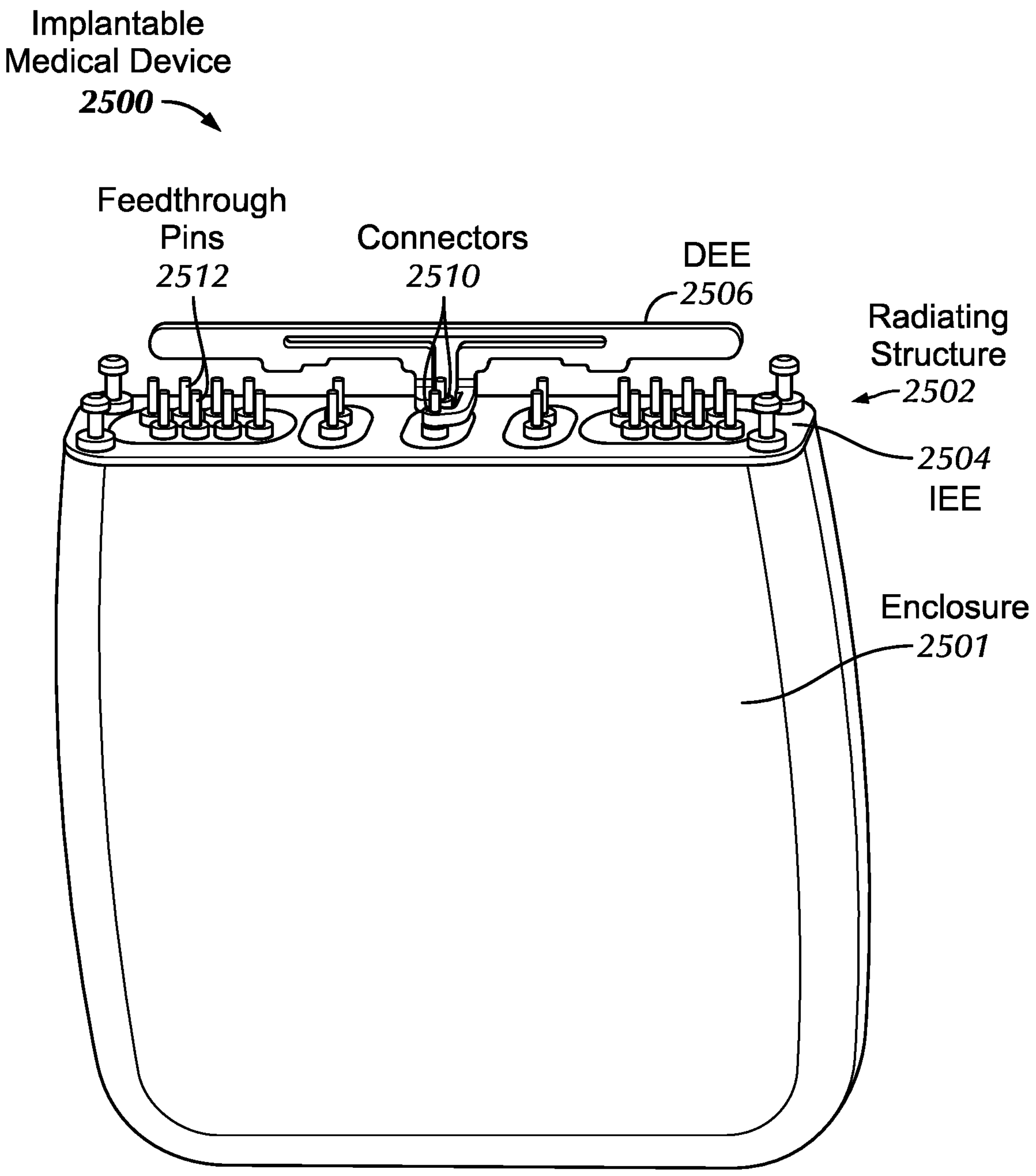
FIG. 25 shows an isometric view of an implantable medical device in accordance with one or more embodiments of the invention.

FIG. 25 shows an isometric view of an embodiment of an implantable medical device (2500). In the present embodiment, the length of the legs of the DEE (2506) are uneven. Further, the feedthrough pins (2512) passing through the IEE (2504) from the enclosure (2501) are located in four banks of feedthrough pins (2512). Two of the banks of feedthrough pins (2512) include eight feedthrough pins (2512) and the other two banks of feedthrough pins (2512) include two feedthrough pins (2512). Further, the present embodiment illustrates a DEE (2506) that includes bent legs that are electrically coupled to circuitry within the enclosure (2501). In one or more embodiments, the legs may include any number of bends along their length.

Figure 26:
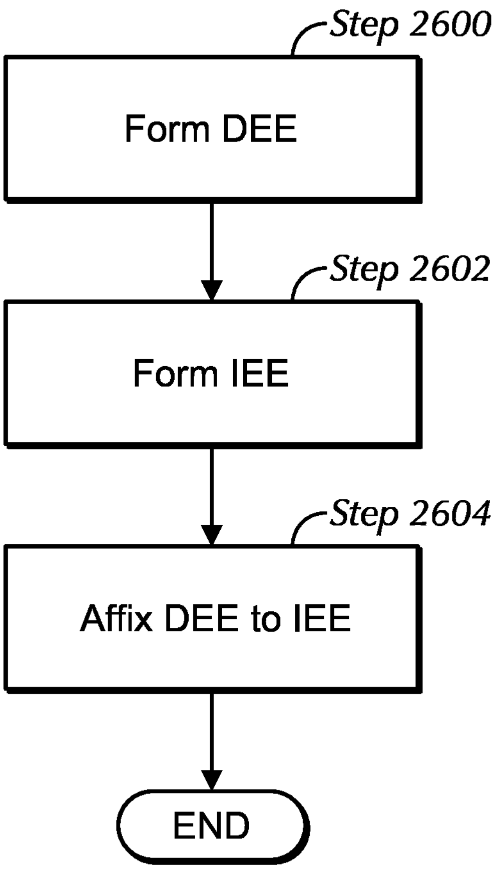
FIG. 26 shows a method for manufacturing a radiating structure in accordance with one or more embodiments of the invention.

FIG. 26 shows a flowchart of a method in accordance with one or more embodiments of the invention. The method depicted in FIG. 26 may be used to manufacture a radiating structure in accordance with one or more embodiments of the invention.

In step 2600, a DEE structure is formed. The DEE structure may be formed from a sheet metal. For example, the DEE structure may be cut from the sheet metal using, for example, stamping, laser cutting, water cutting, machining, cutting with a tool, or any other method for cutting sheet metal. In addition, the forming may include forming one or more pieces together to form the DEE such as welding or brazing multiple pieces together. Moreover, the forming may include methods of additive manufacturing such as 3D printing. Further, as described above, the DEE structure may include one or more bends. As such, step 2600 may include bending the DEE structure one or more times to form the DEE structure to any one of the embodiments provided herein.

In step 2602, the IEE is formed. The IEE may be formed from a sheet metal. For example, the IEE may be cut from the sheet metal using, for example, stamping, laser cutting, water cutting, machining, cutting with a tool, or any other method for cutting sheet metal. In addition, the forming may include forming one or more pieces together to form the DEE such as welding or brazing multiple pieces together. Moreover, the forming may include methods of additive manufacturing such as 3D printing. Further, as described above, the IEE may include a number of conduits to enable feedthrough pins and connectors for the DEE structure to pass through. As such, step 2602 also includes cutting a number of conduits through the IEE.

In step 2604, the DEE structure is affixed to the IEE. The DEE structure may be affixed to the IEE by, for example, soldering or welding. Affixing the DEE structure to the IEE forms the radiating structure as described above. Further, as described above, the DEE structure may be affixed to the IEE at any angle as described above.

The method may end following step 2604.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. An implantable radiating structure comprising:

a directly excited element ("DEE") comprising a top portion, a gap portion, and a bottom portion, wherein the bottom portion comprises a first leg and a second leg, each configured to couple to circuitry to complete a circuit, wherein the gap portion is between the top portion and the bottom portion, wherein the top portion is coupled to the bottom portion via a connector, wherein an unbent portion of the top portion, the gap portion, and the bottom portion of the DEE are planar, wherein the top portion extends along a first length at least equal to a second length of the bottom portion, and wherein the top portion comprises a bent portion extending along the first length and wherein the bent portion bends at least 90 degrees;

an indirectly excited element ("IEE") radiatively coupled to the DEE, wherein the IEE is positioned at an angle with respect to the DEE structure, wherein the DEE structure is orthogonal to the IEE, wherein the DEE and the IEE are not directly connected to one another, and wherein the implantable radiating structure is configured to be implanted inside a human body.

2. An implantable radiating structure comprising:

a directly excited element ("DEE") comprising a top portion, a gap portion, and a bottom portion, wherein the bottom portion comprises a first leg and a second leg, each configured to couple to circuitry to complete a circuit, wherein the gap portion is between the top portion and the bottom portion, wherein the top portion is coupled to the bottom portion via a connector, wherein the top portion extends along a first length at least equal to a second length of the bottom portion, and wherein the top portion comprises a bent portion extending along the first length and wherein the bent portion bends at least 90 degrees; and an indirectly excited element ("IEE") radiatively coupled to the DEE, wherein the IEE is positioned at an angle with respect to the DEE, and wherein the implantable radiating structure is configured to be implanted inside a human body.

3. The implantable radiating structure of claim 2, wherein an unbent portion of the top portion, the gap portion, and the bottom portion of the DEE are planar.

4. The implantable radiating structure of claim 3, wherein the DEE is orthogonal to the IEE.

5. The implantable radiating structure of claim 2, wherein the bent portion bends at least 120 degrees.

6. The implantable radiating structure of claim 2, wherein bottom portion has a different length than the top portion.

7. The implantable radiating structure of claim 2, wherein bottom portion has a different cross-sectional area than the top portion.

8. The implantable radiating structure of claim 2, wherein the top portion and the bottom portion have a same width.

9. The implantable radiating structure of claim 2, wherein the DEE is electrically coupled to a transmitter and a receiver.

10. The implantable radiating structure of claim 9, wherein a first impedance of the DEE matches a second impedance of the transmitter and receiver.

11. The implantable radiating structure of claim 2, wherein the implantable radiating structure comprises a voltage standing wave ratio of between 1 and 2.5 at a bandwidth of 100 to 1000 MHz.

12. The implantable radiating structure of claim 2, wherein the IEE comprises at least two holes configured to allow feedthrough pins to pass through.

13. The implantable radiating structure of claim 2, wherein the first and second legs extend toward the IEE.

14. The implantable radiating structure of claim 13, wherein the at least one of the first and second legs is configured to couple to a feedthrough pin extending through the IEE.

15. A method for manufacturing a radiating structure comprising:

forming, from a first sheet of metal, a directly excited element ("DEE") comprising a top portion, a gap portion, and a bottom portion, wherein the bottom portion comprises a first leg and a second leg, each configured to couple to circuitry to complete a circuit, wherein the gap portion is between the top portion and the bottom portion, wherein the top portion is coupled to the bottom portion via a connector, wherein an unbent portion of the top portion, the gap portion, and the bottom portion of the DEE are planar, wherein the top portion extends along a first length at least equal to a second length of the bottom portion, and wherein the top portion comprises a bent portion extending along the first length and wherein the bent portion bends at least 90 degrees;

forming, from a second sheet of metal, an indirectly excited element ("IEE"); and affixing the DEE to the IEE at an angle, wherein affixing the DEE to the IEE radiatively couples the IEE to the DEE.

16. The method of claim 15, wherein the forming the DEE is via stamping, additive manufacturing, or cutting the first sheet of metal and wherein the DEE and IEE comprises a voltage standing wave ratio of between 1 and 2.5 at a bandwidth of 100 to 1000 MHz.

* * * * *